United States Patent
Bhardwaj et al.

(10) Patent No.: US 10,200,828 B2
(45) Date of Patent: Feb. 5, 2019

(54) TECHNIQUES AND APPARATUSES FOR UTILIZING MEASUREMENT GAPS TO PERFORM SIGNAL DECODING FOR A MULTIMEDIA BROADCAST OR MULTICAST SERVICE

(71) Applicant: QUALCOMM Incorporated, San Diego, CA (US)

(72) Inventors: Ashish Bhardwaj, Hyderabad (IN); Manjunatha Subbamma Ananda, Hyderabad (IN); Venkateswarlu Bandaru, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 23 days.

(21) Appl. No.: 15/427,859

(22) Filed: Feb. 8, 2017

(65) Prior Publication Data

US 2018/0227717 A1 Aug. 9, 2018

(51) Int. Cl.
| | |
|---|---|
| *H04W 4/06* | (2009.01) |
| *H04W 24/10* | (2009.01) |
| *H04W 36/00* | (2009.01) |
| *H04L 12/18* | (2006.01) |
| *H04W 36/30* | (2009.01) |
| *H04W 36/32* | (2009.01) |

(52) U.S. Cl.
CPC .............. *H04W 4/06* (2013.01); *H04W 24/10* (2013.01); *H04W 36/0088* (2013.01); *H04L 12/189* (2013.01); *H04W 36/0094* (2013.01); *H04W 36/30* (2013.01); *H04W 36/32* (2013.01)

(58) Field of Classification Search
CPC ....... H04W 4/06; H04W 24/02; H04W 24/04; H04W 24/10; H04W 72/005; H04W 76/40

See application file for complete search history.

(56) References Cited

U.S. PATENT DOCUMENTS

| | | | |
|---|---|---|---|
| 8,837,433 B2 | 9/2014 | Amerga et al. | |
| 8,842,564 B2 | 9/2014 | Kazmi et al. | |
| 2015/0245235 A1 | 8/2015 | Tang et al. | |
| 2016/0088512 A1* | 3/2016 | Bergstrom | H04W 28/0263 370/330 |
| 2016/0286454 A1* | 9/2016 | Mager | H04W 36/0088 |

(Continued)

OTHER PUBLICATIONS

Qualcomm Incorporated: "Service Continuity of Group Communication", 3GPP TSG RAN WG2 #85; R2-140052, Release 12, Prague, Czech Republic, Feb. 10-14, 2014, pp. 1-5.

(Continued)

*Primary Examiner* — Pao Sinkantarakorn
(74) *Attorney, Agent, or Firm* — Harrity & Harrity, LLP

(57) ABSTRACT

Certain aspects of the present disclosure generally relate to wireless communication. In some aspects, a wireless communication device may determine, when involved in a multimedia broadcast or multicast service, a set of parameters relating to the state of the wireless communication device. In some aspects, the wireless communication device may determine to decode a signal associated with the multimedia broadcast or multicast service during a measurement gap based at least in part on the set of parameters. In some aspects, the measurement gap may be a gap configured for performing an intra-radio access technology (IRAT) or inter-frequency cell measurement.

30 Claims, 13 Drawing Sheets

(56) References Cited

U.S. PATENT DOCUMENTS

2016/0316345 A1    10/2016  Shauh et al.
2016/0381588 A1*   12/2016  Strobl .................. H04W 24/10
                                                        455/67.11

OTHER PUBLICATIONS

International Search Report and Written Opinion—PCT/US2018/012291—ISA/EPO—dated Mar. 23, 2018.

* cited by examiner

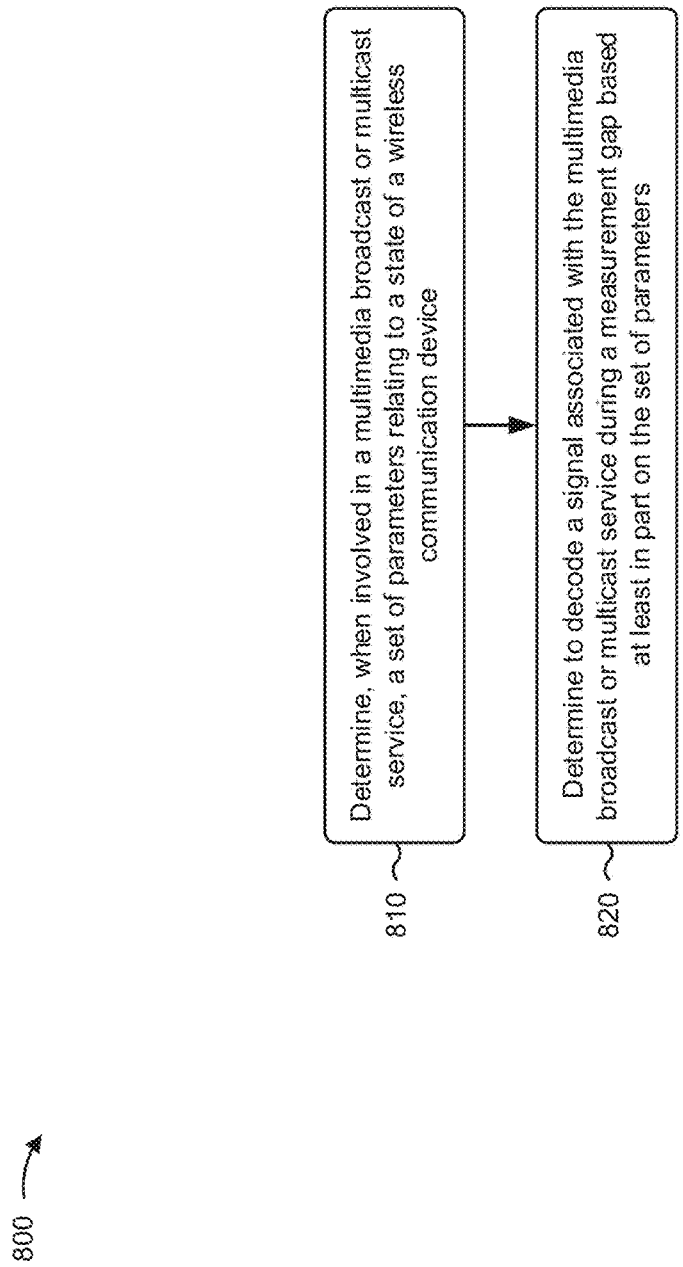

TECHNIQUES AND APPARATUSES FOR UTILIZING MEASUREMENT GAPS TO PERFORM SIGNAL DECODING FOR A MULTIMEDIA BROADCAST OR MULTICAST SERVICE

FIELD OF THE DISCLOSURE

Aspects of the present disclosure generally relate to wireless communication, and more particularly to techniques and apparatuses for utilizing measurement gaps to perform signal decoding for a multimedia broadcast or multicast service.

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, a national, a regional, and even a global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, using new spectrum, and integrating with other open standards using OFDMA on the downlink (DL), SC-FDMA on the uplink (UL), and multiple-input multiple-output (MIMO) antenna technology.

SUMMARY

In some aspects, a method of wireless communication may include determining, by a user equipment (UE) involved in a multimedia broadcast or multicast service, a set of parameters relating to a state of the UE. The method may include determining, by the UE, to decode a signal associated with the multimedia broadcast or multicast service during a measurement gap based at least in part on the set of parameters. The measurement gap may be a gap configured for performing an intra-radio access technology (IRAT) or inter-frequency cell measurement.

In some aspects, a device may include a memory and one or more processors operatively coupled to the memory. The one or more processors may be configured to determine, when involved in a multimedia broadcast or multicast service, a set of parameters relating to a state of the device. The one or more processors may be configured to determine to decode a signal associated with the multimedia broadcast or multicast service during a measurement gap based at least in part on the set of parameters. The measurement gap may be a gap configured for performing an IRAT or inter-frequency cell measurement.

In some aspects, a non-transitory computer-readable medium may store one or more instructions for wireless communication. The one or more instructions, when executed by one or more processors of a wireless communication device, may cause the one or more processors to determine, when involved in a multimedia broadcast or multicast service, a set of parameters relating to a state of the wireless communication device. The one or more instructions, when executed by the one or more processors, may cause the one or more processors to determine to decode a signal associated with the multimedia broadcast or multicast service during a measurement gap based at least in part on the set of parameters. The measurement gap may be a gap configured for performing an IRAT or inter-frequency cell measurement In some aspects, an apparatus for wireless communication may include means for determining, when involved in a multimedia broadcast or multicast service, a set of parameters relating to a state of the apparatus. The apparatus may include means for determining to decode a signal associated with the multimedia broadcast or multicast service during a measurement gap based at least in part on the set of parameters. The measurement gap may be a gap configured for performing an IRAT or inter-frequency cell measurement.

Aspects generally include a method, apparatus, system, computer program product, non-transitory computer-readable medium, user equipment, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process performed, for example, by a wireless communication device, in accordance with various aspects of the present disclosure.

DETAILED DESCRIPTION

Figure 1:
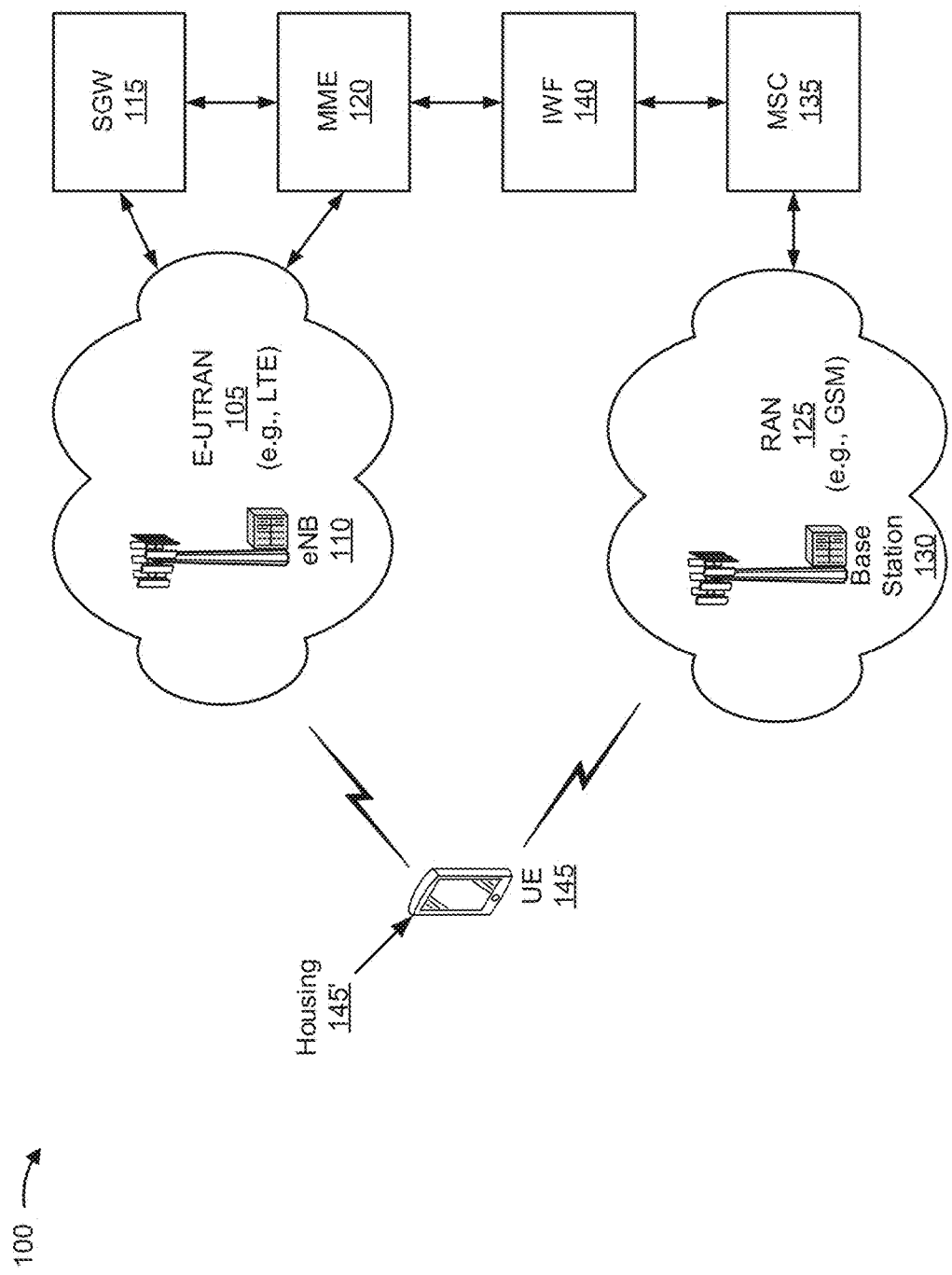
FIG. 1 is a diagram illustrating an example deployment in which multiple wireless networks have overlapping coverage, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details.

The techniques described herein may be used for one or more of various wireless communication networks such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT) such as universal terrestrial radio access (UTRA), CDMA2000, and/or the like. UTRA may include wideband CDMA (WCDMA) and/or other variants of CDMA. CDMA2000 may include Interim Standard (IS)-2000, IS-95 and IS-856 standards. IS-2000 may also be referred to as 1× radio transmission technology (1×RTT), CDMA2000 1×, and/or the like. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, and/or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above as well as other wireless networks and RATs.

Additionally, or alternatively, the techniques described herein may be used in connection with New Radio (NR), which may also be referred to as 5G. New Radio is a set of enhancements to the LTE mobile standard promulgated by the 3GPP. NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation.

FIG. 1 is a diagram illustrating an example deployment 100 in which multiple wireless networks have overlapping coverage, in accordance with various aspects of the present disclosure. However, wireless networks may not have overlapping coverage in aspects. As shown, example deployment 100 may include an evolved universal terrestrial radio access network (E-UTRAN) 105, which may include one or more evolved Node Bs (eNBs) 110, and which may communicate with other devices or networks via a serving gateway (SGW) 115 and/or a mobility management entity (MME) 120. As further shown, example deployment 100 may include a radio access network (RAN) 125, which may include one or more base stations 130, and which may communicate with other devices or networks via a mobile switching center (MSC) 135 and/or an inter-working function (IWF) 140. As further shown, example deployment 100 may include one or more user equipment (UEs) 145 capable of communicating via E-UTRAN 105 and/or RAN 125.

E-UTRAN 105 may support, for example, LTE or another type of RAT. E-UTRAN 105 may include eNBs 110 and other network entities that can support wireless communication for UEs 145. Each eNB 110 may provide communication coverage for a particular geographic area. The term "cell" may refer to a coverage area of eNB 110 and/or an eNB subsystem serving the coverage area on a specific frequency channel.

SGW 115 may communicate with E-UTRAN 105 and may perform various functions, such as packet routing and forwarding, mobility anchoring, packet buffering, initiation of network-triggered services, and/or the like. MME 120 may communicate with E-UTRAN 105 and SGW 115 and may perform various functions, such as mobility management, bearer management, distribution of paging messages, security control, authentication, gateway selection, and/or the like, for UEs 145 located within a geographic region served by MME 120 of E-UTRAN 105. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

RAN 125 may support, for example, GSM or another type of RAT. RAN 125 may include base stations 130 and other network entities that can support wireless communication for UEs 145. MSC 135 may communicate with RAN 125 and may perform various functions, such as voice services, routing for circuit-switched calls, and mobility management for UEs 145 located within a geographic region served by MSC 135 of RAN 125. In some aspects, IWF 140 may facilitate communication between MME 120 and MSC 135 (e.g., when E-UTRAN 105 and RAN 125 use different RATs). Additionally, or alternatively, MME 120 may communicate directly with an MME that interfaces with RAN 125, for example, without IWF 140 (e.g., when E-UTRAN 105 and RAN 125 use a same RAT). In some aspects, E-UTRAN 105 and RAN 125 may use the same frequency and/or the same RAT to communicate with UE 145. In some aspects, E-UTRAN 105 and RAN 125 may use different frequencies and/or RATs to communicate with UEs 145. As used herein, the term base station is not tied to any particular RAT, and may refer to an eNB (e.g., of an LTE network) or another type of base station associated with a different type of RAT.

In general, any number of wireless networks may be deployed in a given geographic area. Each wireless network may support a particular RAT and may operate on one or more frequencies. A RAT may also be referred to as a radio technology, an air interface, and/or the like. A frequency or frequency ranges may also be referred to as a carrier, a frequency channel, and/or the like. Each frequency or frequency range may support a single RAT in a given geographic area in order to avoid interference between wireless networks of different RATs.

UE 145 may be stationary or mobile and may also be referred to as a mobile station, a terminal, an access terminal, a wireless communication device, a subscriber unit, a station, and/or the like. UE 145 may be a cellular phone, a personal digital assistant (PDA), a wireless modem, a wireless communication device, a handheld device, a laptop computer, a cordless phone, a wireless local loop (WLL) station, and/or the like. UE 145 may be included inside a housing 145' that houses components of UE 145, such as processor components, memory components, display components (i.e., a screen), and/or the like.

Upon power up, UE 145 may search for wireless networks from which UE 145 can receive communication services. If UE 145 detects more than one wireless network, then a wireless network with the highest priority may be selected to serve UE 145 and may be referred to as the serving network. UE 145 may perform registration with the serving network, if necessary. UE 145 may then operate in a connected mode to actively communicate with the serving network. Alternatively, UE 145 may operate in an idle mode and camp on the serving network if active communication is not required by UE 145.

UE 145 may operate in the idle mode as follows. UE 145 may identify all frequencies/RATs on which it is able to find a "suitable" cell in a normal scenario or an "acceptable" cell in an emergency scenario, where "suitable" and "acceptable" are specified in the LTE standards. UE 145 may then camp on the frequency/RAT with the highest priority among all identified frequencies/RATs. UE 145 may remain camped on this frequency/RAT until either (i) the frequency/RAT is no longer available at a predetermined threshold or (ii) another frequency/RAT with a higher priority reaches this threshold. In some aspects, UE 145 may receive a neighbor list when operating in the idle mode, such as a neighbor list included in a system information block type 5 (SIB 5) provided by an eNB of a RAT on which UE 145 is camped. Additionally, or alternatively, UE 145 may generate a neighbor list. A neighbor list may include information identifying one or more frequencies, at which one or more RATs may be accessed, priority information associated with the one or more RATs, and/or the like.

UE 145 may perform intra-RAT (IRAT) cell measurements or inter-frequency cell measurements during a measurement gap in a transmission or reception period. For example, eNB 110 may configure a particular measurement gap pattern that provides gaps for IRAT or inter-frequency cell measurements, such as configuring a 6 millisecond (ms) measurement gap for each 40 ms period of transmission and/or reception. In this case, the measurement gap may configured as defined by the 3GPP and may be associated with a particular gap pattern. For example, the 3GPP defines a gap pattern identifier 0 as being associated with a measurement gap of 6 ms for each 40 ms period and a minimum available time per 480 ms period of 60 ms. In another example, another measurement gap may be used, such as a measurement gap associated with gap pattern identifier 1. In this case, the 3GPP defines gap pattern identifier 1 as being associated with a 6 ms measurement gap for each 80 ms period and a minimum available time per 480 ms period of 30 ms. Although described herein in terms of the 3GPP specification for a measurement gap, other configurations for a measurement gap may be possible, such as configurations relating to 5G networks, NR networks, or the like.

During the measurement gap, UE 145 may monitor and/or measure a set of IRAT cells, a set of inter-frequency cells, and/or the like. In this case, the 3GPP defines a set of types of cell measurements during the measurement gap, such as inter-frequency E-UTRAN FDD and TDD measurements, UTRAN FDD measurements, GERAN measurements, low chip rate (LCR) TDD measurements, high rate packet data (HRPD) measurements, and CDMA2000 1× measurements. The measurement gaps may be configured to occur concurrently with one or more subframes of a multimedia broadcast or multicast service, such as an evolved multimedia broadcast multicast service (eMBMS) and/or the like. As a result, UE 145 may fail to receive the one or more subframes of the multimedia broadcast or multicast service that are concurrent with the measurement gaps. This may negatively affect audio playback, video playback, file downloading, and/or the like associated with the multimedia broadcast or multicast service.

UE 145 may determine a set of parameters relating to a state of UE 145 when UE 145 is involved in a multimedia broadcast or multicast service. For example, UE 145 may determine a mobility state of UE 145 (e.g., whether UE 145 is being moved at a threshold speed), a signal to noise ratio (SNR) associated with a serving cell of UE 145, a block error rate (BLER) associated with an uplink or a downlink channel associated with UE 145, a unicast data activity state of UE 145 (e.g., whether UE 145 is performing unicast data activity), a combination of any of the foregoing, and/or the like. Satisfaction of the set of parameters may correspond to network conditions under which UE 145 is less likely to utilize the IRAT or intra-frequency cell measurements, such as to perform a handoff, thus obviating a need for performing the IRAT or intra-frequency cell measurements. Based at least in part on the set of parameters, UE 145 may determine to decode a signal associated with the multimedia broadcast or multicast service during a measurement gap, rather than performing IRAT or intra-frequency cell measurements during the measurement gap. In this way, UE 145 improves performance associated with the multimedia broadcast or multicast service relative to interrupting or missing decoding of a signal of the multimedia broadcast or multicast service to perform IRAT or inter-frequency cell measurements during scheduled measurement gaps.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
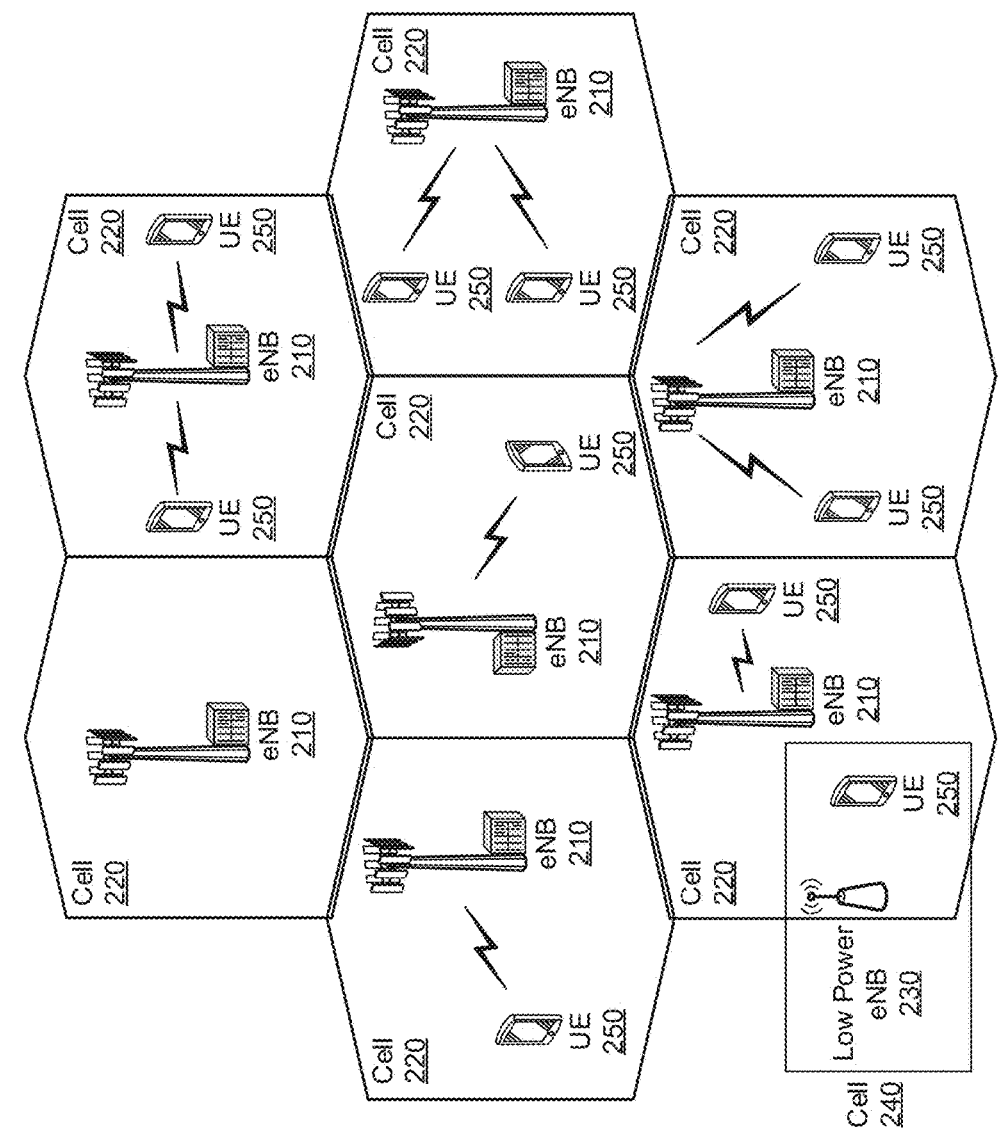
FIG. 2 is a diagram illustrating an example access network in an LTE network architecture, in accordance with various aspects of the present disclosure.

FIG. 2 is a diagram illustrating an example access network 200 in an LTE network architecture, in accordance with various aspects of the present disclosure. As shown, access network 200 may include one or more eNBs 210 (sometimes referred to as "base stations" herein) that serve a corresponding set of cellular regions (cells) 220, one or more low power eNBs 230 that serve a corresponding set of cells 240, and a set of UEs 250.

Each eNB 210 may be assigned to a respective cell 220 and may be configured to provide an access point to a RAN. For example, eNB 110, 210 may provide an access point for UE 145, 250 to E-UTRAN 105 (e.g., eNB 210 may correspond to eNB 110, shown in FIG. 1) or may provide an access point for UE 145, 250 to RAN 125 (e.g., eNB 210 may correspond to base station 130, shown in FIG. 1). In some cases, the terms base station and eNB may be used interchangeably, and a base station, as used herein, is not tied to any particular RAT. UE 145, 250 may correspond to UE 145, shown in FIG. 1. FIG. 2 does not illustrate a centralized controller for example access network 200, but access network 200 may use a centralized controller in some aspects. The eNBs 210 may perform radio related functions including radio bearer control, admission control, mobility control, scheduling, security, and network connectivity (e.g., to SGW 115).

As shown in FIG. 2, one or more low power eNBs 230 may serve respective cells 240, which may overlap with one or more cells 220 served by eNBs 210. The eNBs 230 may correspond to eNB 110 associated with E-UTRAN 105 and/or base station 130 associated with RAN 125, shown in FIG. 1. A low power eNB 230 may be referred to as a remote radio head (RRH). The low power eNB 230 may include a femto cell eNB (e.g., home eNB (HeNB)), a pico cell eNB, a micro cell eNB, and/or the like.

A modulation and multiple access scheme employed by access network 200 may vary depending on the particular telecommunications standard being deployed. In LTE applications, OFDM is used on the downlink (DL) and SC-FDMA is used on the uplink (UL) to support both frequency division duplexing (FDD) and time division duplexing (TDD). The various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. As another example, these concepts may also be extended to UTRA employing WCDMA and other variants of CDMA (e.g., such as TD-SCDMA, GSM employing TDMA, E-UTRA, and/or the like), UMB, IEEE 802.11 (Wi-Fi), IEEE 802.16 (WiMAX), IEEE 802.20, Flash-OFDM employing OFDMA, and/or the like. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 210 may have multiple antennas supporting MIMO technology. The use of MIMO technology enables eNBs 210 to exploit the spatial domain to support spatial multiplexing, beamforming, and transmit diversity. Spatial multiplexing may be used to transmit different streams of data simultaneously on the same frequency. The data streams may be transmitted to a single UE 145, 250 to increase the data rate or to multiple UEs 250 to increase the overall system capacity. This may be achieved by spatially precoding each data stream (e.g., applying a scaling of an amplitude and a phase) and then transmitting each spatially precoded stream through multiple transmit antennas on the DL. The spatially precoded data streams arrive at the UE(s) 250 with different spatial signatures, which enables each of the UE(s) 250 to recover the one or more data streams destined for that UE 145, 250. On the UL, each UE 145, 250 transmits a spatially precoded data stream, which enables eNBs 210 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

A UE 145, 250 operating in access network 200 may determine a set of parameters relating to a state of UE 145, 250. For example, the set of parameters may include one or more parameters, such as whether UE 145, 250 is moving at a threshold speed (e.g., within a cell 220 or between cells 220), an SNR for a particular cell 220 that is a serving cell for UE 145, 250, a BLER of an uplink channel or a downlink channel, a unicast data activity state (e.g., a packet data convergence protocol (PDCP) protocol data unit (PDU)

size), a combination of any of the foregoing, and/or the like. UE 145, 250 may determine whether the set of parameters is satisfied, and may determine to decode a signal associated with a multimedia broadcast or multicast service during a measurement gap for performing an IRAT or inter-frequency cell measurement based at least in part on determining that the set of parameters is satisfied. For example, UE 145, 250 may decode a physical multicast channel (PMCH) of an eMBMS signal during a scheduled measurement gap.

The number and arrangement of devices and cells shown in FIG. 2 are provided as an example. In practice, there may be additional devices and/or cells, fewer devices and/or cells, different devices and/or cells, or differently arranged devices and/or cells than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
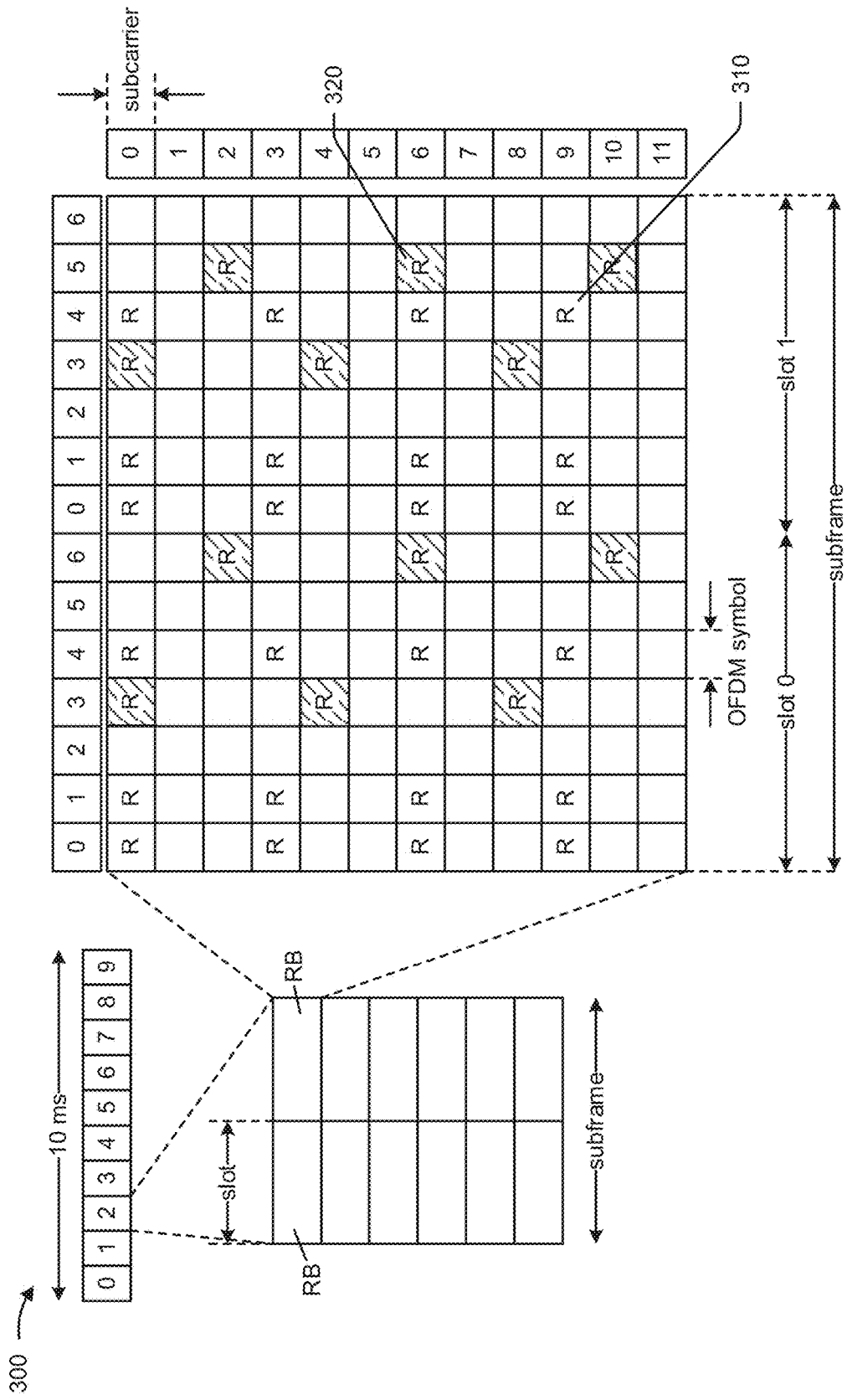
FIG. 3 is a diagram illustrating an example of a downlink frame structure in LTE, in accordance with various aspects of the present disclosure.

FIG. 3 is a diagram illustrating an example 300 of a downlink (DL) frame structure in LTE, in accordance with various aspects of the present disclosure. A frame (e.g., of 10 ms) may be divided into 10 equally sized subframes with indices of 0 through 9. Each subframe may include two consecutive time slots. A resource grid may be used to represent two time slots, each time slot including a resource block (RB). The resource grid is divided into multiple resource elements. In LTE, a resource block includes 12 consecutive subcarriers in the frequency domain and, for a normal cyclic prefix in each OFDM symbol, 7 consecutive OFDM symbols in the time domain, or 84 resource elements. For an extended cyclic prefix, a resource block includes 6 consecutive OFDM symbols in the time domain and has 72 resource elements. Some of the resource elements, as indicated as R 310 and R 320, include DL reference signals (DL-RS). The DL-RS include Cell-specific RS (CRS) (also sometimes called common RS) 310 and UE-specific RS (UE-RS) 320. UE-RS 320 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

UE 145, 250 may receive information from eNB 110, 210, 230 via a DL frame as described herein. For example, UE 145, 250 may receive a signal associated with a multimedia broadcast or multicast service, such as an eMBMS signal and/or the like. UE 145, 250 may selectively decode the multimedia broadcast or multicast service signal based at least in part on determining that a set of parameters relating to a state of UE 145, 250 satisfies a threshold. For example, UE 145, 250 may determine, based at least in part on a Doppler effect associated with a DL frame, that UE 145, 250 is traveling at a threshold speed, and may determine to decode a PMCH associated with an eMBMS signal during a measurement gap configured for performing an IRAT or inter-frequency cell measurement. In this way, UE 145, 250 may improve multimedia broadcast or multicast service performance relative to performing the IRAT or inter-frequency cell measurement during the measurement gap.

As indicated above, FIG. 3 is provided as an example. Other examples are possible and may differ from what was described above in connection with FIG. 3.

Figure 4:
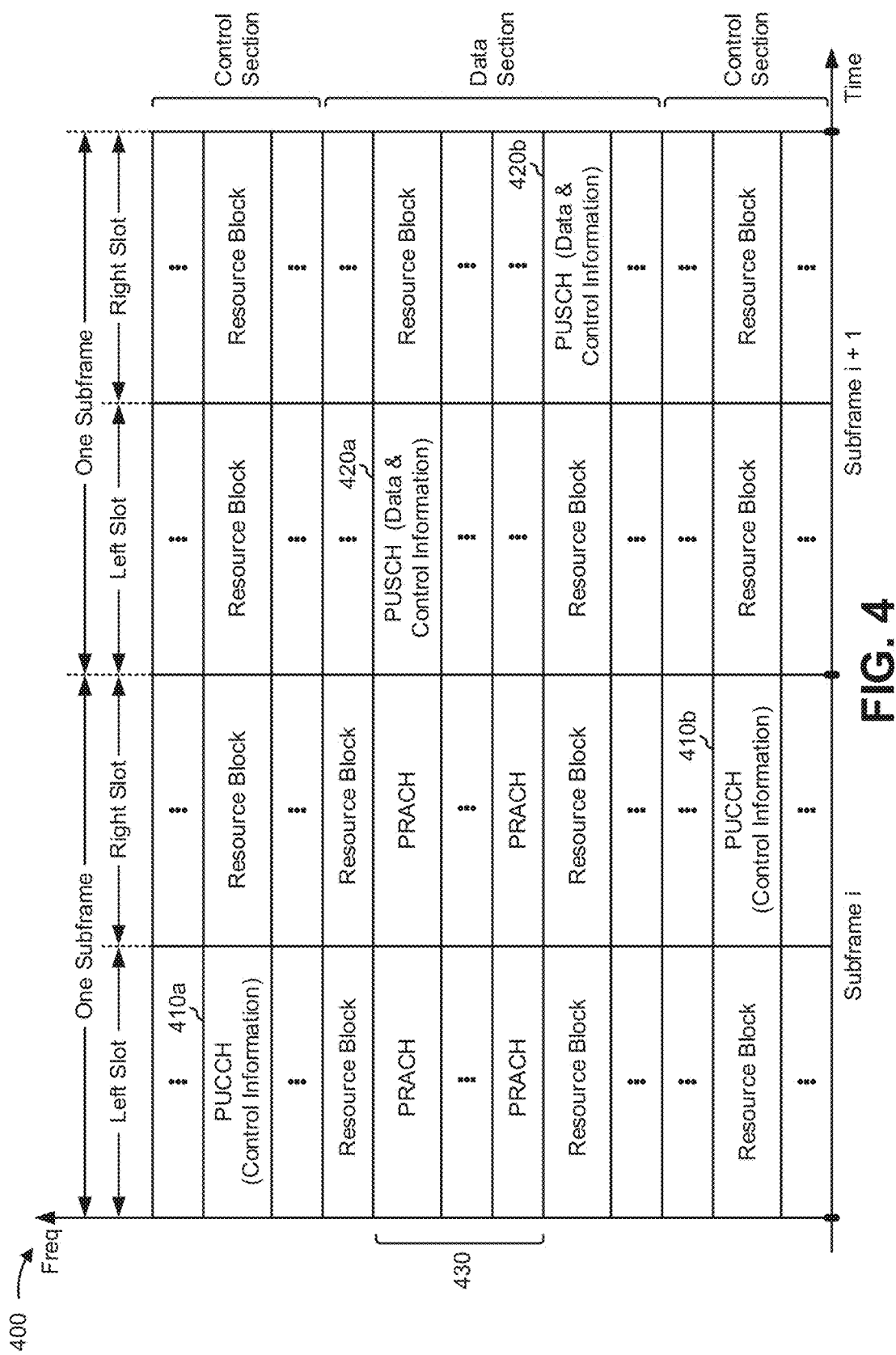
FIG. 4 is a diagram illustrating an example of an uplink frame structure in LTE, in accordance with various aspects of the present disclosure.

FIG. 4 is a diagram illustrating an example 400 of an uplink (UL) frame structure in LTE, in accordance with various aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequencies.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., of 1 ms) or in a sequence of few contiguous subframes and a UE can make only a single PRACH attempt per frame (e.g., of 10 ms).

UE 145, 250 may transmit one or more signals via a UL frame, as described herein. For example, UE 145, 250 may transmit data associated with unicast data activity via a UL frame, and may determine that a unicast data activity state satisfies a condition based at least in part on transmitting the data associated with the unicast data activity. In this case, the unicast data activity state may relate to whether UE 145, 250 is performing a browsing activity, whether UE 145, 250 is performing a file transfer protocol (FTP) activity, whether a threshold PDCP PDU size is satisfied, whether a physical downlink control channel (PDCCH) downlink or uplink data count threshold is satisfied, and/or the like. Additionally, or alternatively, UE 145, 250 may determine other parameters relating to a network, such as an SNR, a BLER, a mobility state, and/or the like. Based at least in part on determining one or more of the parameters relating to a state of UE 145, 250, UE 145, 250 may determine to decode a signal associated with a multimedia broadcast or multicast service during a measurement gap configured for performing an IRAT or inter-frequency cell measurement.

As indicated above, FIG. 4 is provided as an example. Other examples are possible and may differ from what was described above in connection with FIG. 4.

Figure 5:
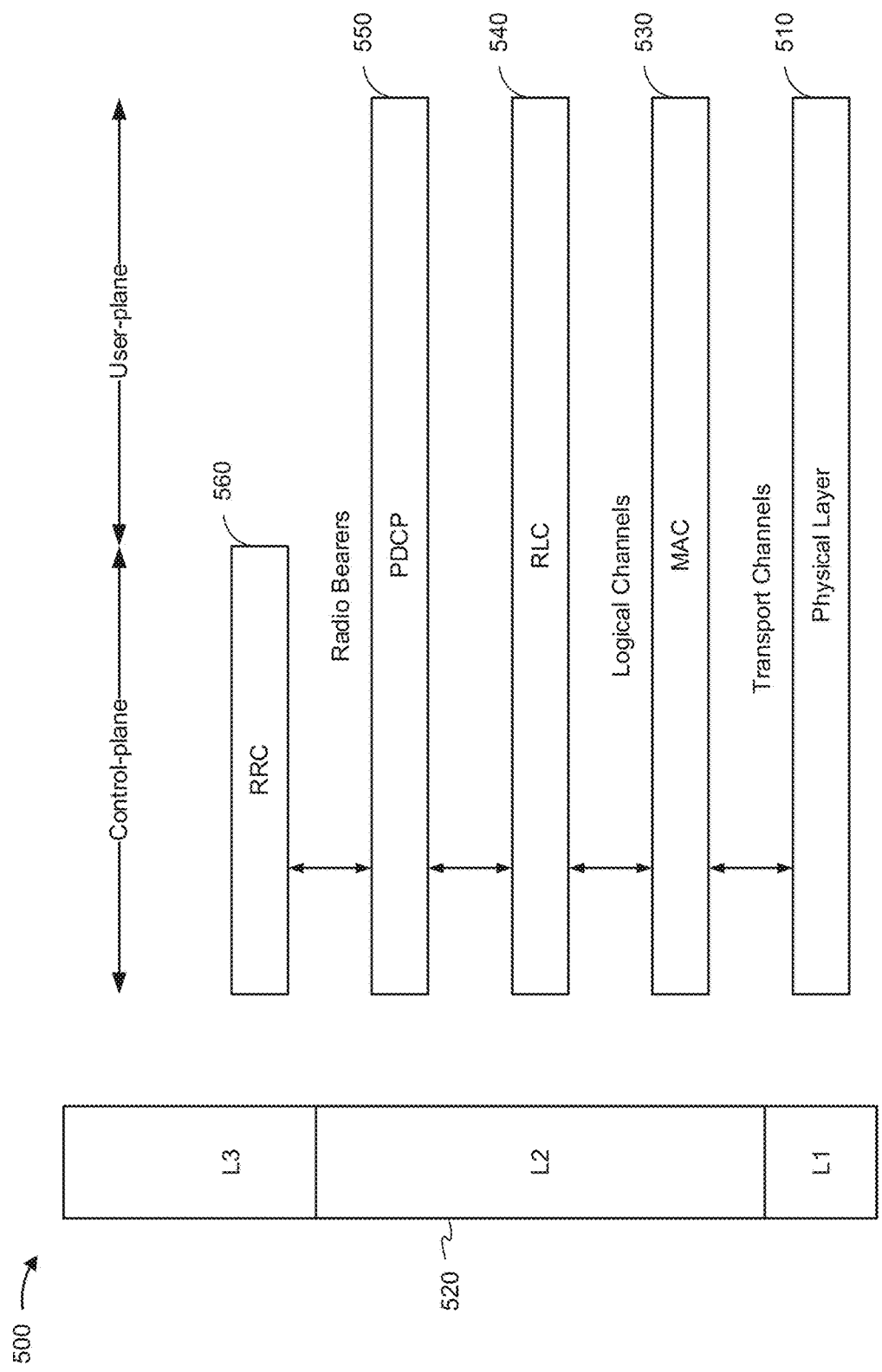
FIG. 5 is a diagram illustrating an example of a radio protocol architecture for a user plane and a control plane in LTE, in accordance with various aspects of the present disclosure.

FIG. 5 is a diagram illustrating an example 500 of a radio protocol architecture for a user plane and a control plane in LTE, in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 510. Layer 2 (L2 layer) 520 is above the physical layer 510 and is responsible for the link between the UE and eNB over the physical layer 510.

In the user plane, the L2 layer 520 includes, for example, a media access control (MAC) sublayer 530, a radio link control (RLC) sublayer 540, and a packet data convergence protocol (PDCP) sublayer 550, which are terminated at the eNB on the network side. Although not shown, the UE may have several upper layers above the L2 layer 520 including a network layer (e.g., IP layer) that is terminated at a packet data network (PDN) gateway on the network side, and an application layer that is terminated at the other end of the connection (e.g., a far end UE, a server, and/or the like).

The PDCP sublayer 550 provides retransmission of lost data in handover. The PDCP sublayer 550 also provides header compression for upper layer data packets to reduce radio transmission overhead, security by ciphering the data packets, and handover support for UEs between eNBs. The RLC sublayer 540 provides segmentation and reassembly of upper layer data packets, retransmission of lost data packets, and reordering of data packets to compensate for out-of-order reception due to hybrid automatic repeat request (HARQ). The MAC sublayer 530 provides multiplexing between logical and transport channels. The MAC sublayer 530 is also responsible for allocating the various radio resources (e.g., resource blocks) in one cell among the UEs. The MAC sublayer 530 is also responsible for HARQ operations.

In the control plane, the radio protocol architecture for the UE and eNB is substantially the same for the physical layer 510 and the L2 layer 520 with the exception that there is no header compression function for the control plane. The control plane also includes a radio resource control (RRC) sublayer 560 in Layer 3 (L3 layer). The RRC sublayer 560 is responsible for obtaining radio resources (i.e., radio bearers) and for configuring the lower layers using RRC signaling between the eNB and the UE.

As indicated above, FIG. 5 is provided as an example. Other examples are possible and may differ from what was described above in connection with FIG. 5.

Figure 6:
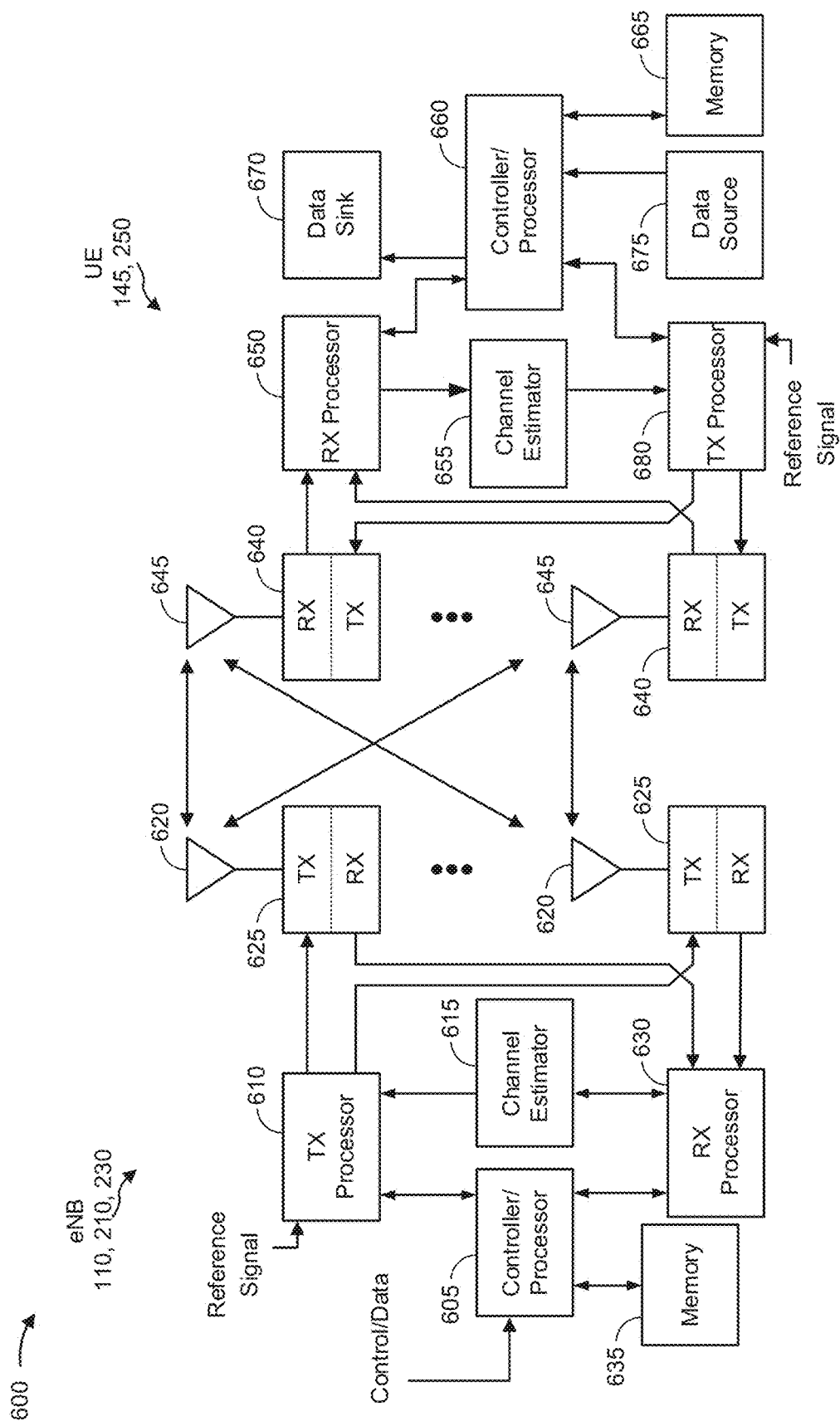
FIG. 6 is a diagram illustrating example components of an evolved Node B and a user equipment in an access network, in accordance with various aspects of the present disclosure.

FIG. 6 is a diagram illustrating example components 600 of eNB 110, 210, 230 and UE 145, 250 in an access network, in accordance with various aspects of the present disclosure. As shown in FIG. 6, eNB 110, 210, 230 may include a controller/processor 605, a TX processor 610, a channel estimator 615, an antenna 620, a transmitter 625TX, a receiver 625RX, an RX processor 630, and a memory 635. As further shown in FIG. 6, UE 145, 250 may include a receiver RX, for example, of a transceiver TX/RX 640, a transmitter TX, for example, of a transceiver TX/RX 640, an antenna 645, an RX processor 650, a channel estimator 655, a controller/processor 660, a memory 665, a data sink 670, a data source 675, and a TX processor 680.

In the DL, upper layer packets from the core network are provided to controller/processor 605. The controller/processor 605 implements the functionality of the L2 layer. In the DL, the controller/processor 605 provides header compression, ciphering, packet segmentation and reordering, multiplexing between logical and transport channels, and radio resource allocations to the UE 145, 250 based, at least in part, on various priority metrics. The controller/processor 605 is also responsible for HARQ operations, retransmission of lost packets, and signaling to the UE 145, 250.

The TX processor 610 implements various signal processing functions for the L1 layer (e.g., physical layer). The signal processing functions includes coding and interleaving to facilitate forward error correction (FEC) at the UE 145, 250 and mapping to signal constellations based, at least in part, on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 615 may be used to determine the coding and modulation scheme, as well as for spatial processing. The channel estimate may be derived from a reference signal and/or channel condition feedback transmitted by the UE 145, 250. Each spatial stream is then provided to a different antenna 620 via a separate transmitter TX, for example, of transceiver TX/RX 625. Each such transmitter TX modulates an RF carrier with a respective spatial stream for transmission.

At the UE 145, 250, each receiver RX, for example, of a transceiver TX/RX 640 receives a signal through its respective antenna 645. Each such receiver RX recovers information modulated onto an RF carrier and provides the information to the receiver (RX) processor 650. The RX processor 650 implements various signal processing functions of the L1 layer. The RX processor 650 performs spatial processing on the information to recover any spatial streams destined for the UE 145, 250. If multiple spatial streams are destined for the UE 145, 250, the spatial streams may be combined by the RX processor 650 into a single OFDM symbol stream. The RX processor 650 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 110, 210, 230. These soft decisions may be based, at least in part, on channel estimates computed by the channel estimator 655. The soft decisions are then decoded and deinterleaved to recover the data and control signals that were originally transmitted by the eNB 110, 210, 230 on the physical channel. The data and control signals are then provided to the controller/processor 660.

The controller/processor 660 implements the L2 layer. The controller/processor 660 can be associated with a memory 665 that stores program codes and data. The memory 665 may include a non-transitory computer-readable medium. In the UL, the controller/processor 660 provides demultiplexing between transport and logical channels, packet reassembly, deciphering, header decompression, control signal processing to recover upper layer packets from the core network. The upper layer packets are then provided to a data sink 670, which represents all the protocol layers above the L2 layer. Various control signals may also be provided to the data sink 670 for L3 processing. The controller/processor 660 is also responsible for error detection using an acknowledgement (ACK) and/or negative acknowledgement (NACK) protocol to support HARQ operations.

In the UL, a data source 675 is used to provide upper layer packets to the controller/processor 660. The data source 675 represents all protocol layers above the L2 layer. Similar to the functionality described in connection with the DL transmission by the eNB 110, 210, 230, the controller/processor 660 implements the L2 layer for the user plane and the control plane by providing header compression, ciphering, packet segmentation and reordering, and multiplexing between logical and transport channels based, at least in part, on radio resource allocations by the eNB 110, 210, 230. The controller/processor 660 is also responsible for HARQ operations, retransmissions of lost packets, and signaling to the eNB 110, 210, 230.

Channel estimates derived by a channel estimator 655 from a reference signal or feedback transmitted by the eNB 110, 210, 230 may be used by the TX processor 680 to select the appropriate coding and modulation schemes, and to facilitate spatial processing. The spatial streams generated by the TX processor 680 are provided to different antenna 645 via separate transmitters TX, for example, of transceivers TX/RX 640. Each transmitter TX, for example, of transceiver TX/RX 640 modulates an RF carrier with a respective spatial stream for transmission.

The UL transmission is processed at the eNB 110, 210, 230 in a manner similar to that described in connection with the receiver function at the UE 145, 250. Each receiver RX, for example, of transceiver TX/RX 625 receives a signal through its respective antenna 620. Each receiver RX, for example, of transceiver TX/RX 625 recovers information modulated onto an RF carrier and provides the information to a RX processor 630. The RX processor 630 may implement the L1 layer.

The controller/processor 605 implements the L2 layer. The controller/processor 605 can be associated with a memory 635 that stores program code and data. The memory 635 may be referred to as a computer-readable medium. In the UL, the control/processor 605 provides demultiplexing between transport and logical channels, packet reassembly, deciphering, header decompression, control signal processing to recover upper layer packets from the UE 145, 250. Upper layer packets from the controller/processor 605 may be provided to the core network. The controller/processor 605 is also responsible for error detection using an ACK and/or NACK protocol to support HARQ operations.

In some aspects, one or more components of UE 145, 250 may be included in a housing 145', as shown in FIG. 1. One or more components of UE 145, 250 may be configured to determine to decode a signal associated with a multimedia broadcast or multicast service during a measurement gap configured for performing an IRAT or inter-frequency cell measurement based at least in part on a set of parameters relating to a state of UE 145, 250, as described in more detail elsewhere herein. For example, the controller/processor 660 and/or other processors and modules of UE 145, 250 may perform or direct operations of, for example, process 800 of FIG. 8 and/or other processes as described herein. In some aspects, one or more of the components shown in FIG. 6 may be employed to perform example process 800 and/or other processes for the techniques described herein.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

As described in more detail below, a wireless communication device, which may correspond to UE 145, 250, may determine to decode a signal associated with a multimedia broadcast or multicast service, such as an eMBMS signal, during a measurement gap based at least in part on a set of parameters relating to a state of UE 145, 250. The measurement gap may be a gap configured for performing an IRAT or inter-frequency cell measurement. UE 145, 250 may decode the signal associated with the multimedia broadcast or multicast service, thereby reducing a likelihood of an interruption to video playback, audio playback, file download, and/or the like associated with the multimedia broadcast or multicast service as a result of performing the IRAT or inter-frequency cell measurement. In this way, UE 145, 250 improves performance relating to the multimedia broadcast or multicast service.

Figure 7A:
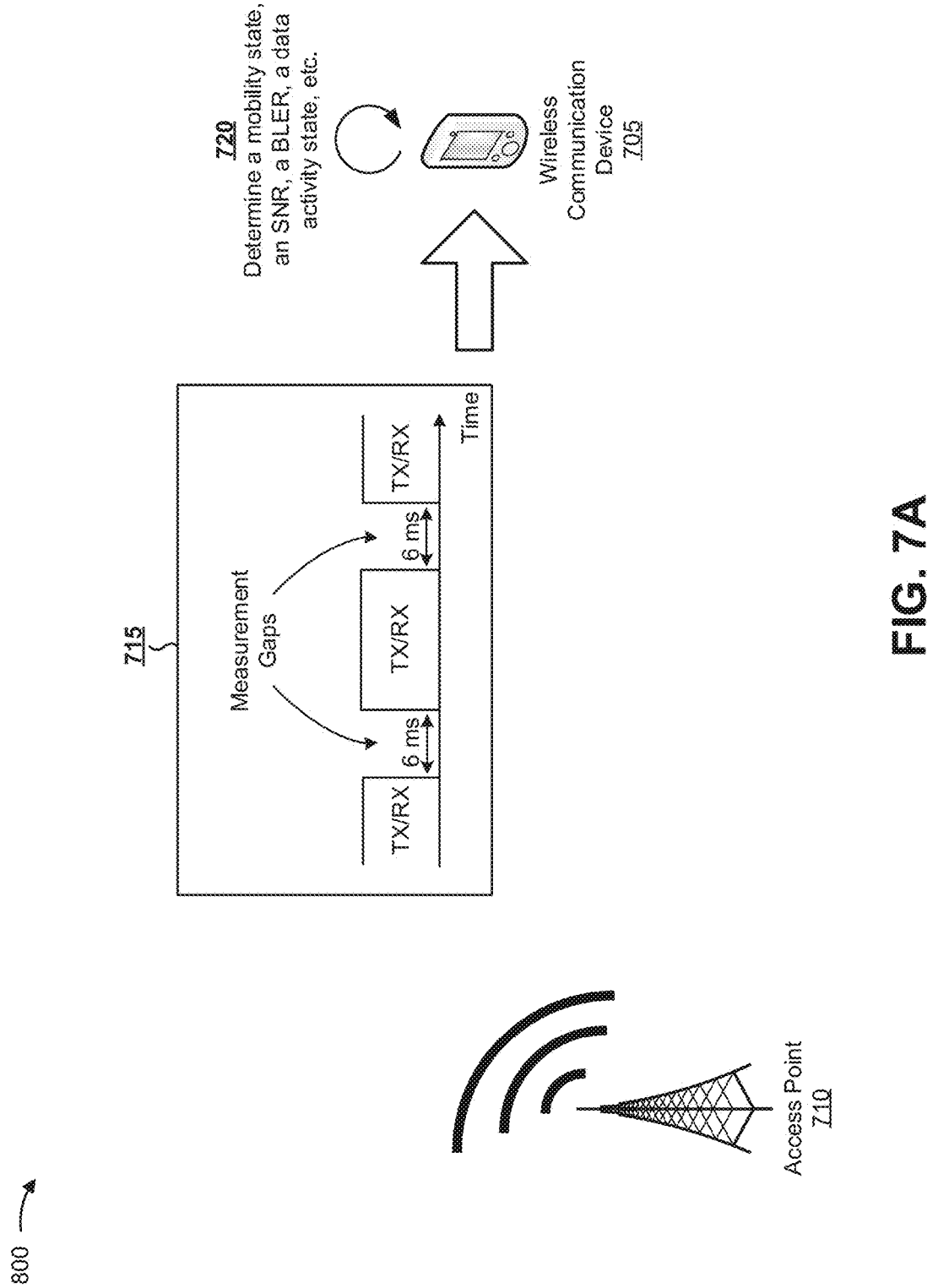
FIGS. 7A and 7B are diagrams illustrating an example of utilizing measurement gaps to perform signal decoding, in accordance with various aspects of the present disclosure.
Figure 7B:
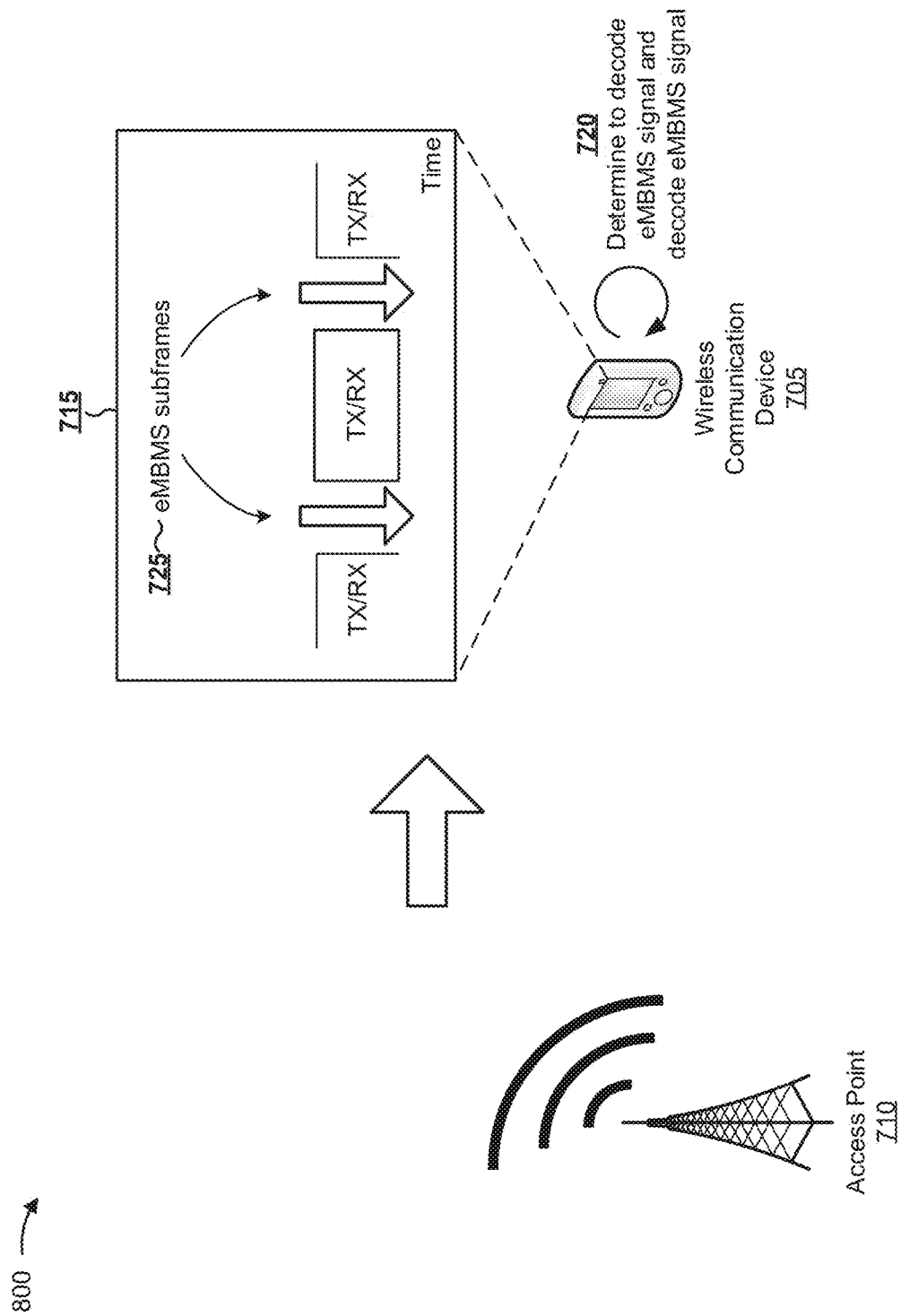

FIGS. 7A and 7B are diagrams illustrating an example 700 of utilizing measurement gaps to perform signal decoding, in accordance with various aspects of the present disclosure.

As shown in FIG. 7A, example 700 may include a wireless communication device 705 (e.g., UE 145, 250) and an access point 710 (e.g., eNB 110, 210, 230). As shown, access point 710 and wireless communication device 705 may exchange one or more signals according to a configured schedule 715. For example, access point 710 may configure a schedule 715 for unicast transmissions that includes a first set of time periods for transmission and/or reception by wireless communication device 705 and a second set of time periods reserved as measurement gaps (e.g., where there is no transmission or reception by wireless communication device 705) for wireless communication device 705 to perform IRAT or inter-frequency cell measurements.

In some aspects, the measurement gaps may be configured with a particular pattern and/or duration. For example, the measurement gaps may be configured such that for each 40 millisecond (ms) transmission and/or reception period, wireless communication device 705 is scheduled for a 6 ms measurement gap to perform an IRAT or inter-frequency cell measurement. In some aspects, wireless communication device 705 may receive a multimedia broadcast or multicast signal associated with another schedule. For example, wireless communication device 705 may receive an eMBMS signal that is configured without measurement gaps or that is configured to include measurement gaps corresponding to a different schedule, pattern, and/or duration than the measurement gaps of schedule 715 for unicast transmissions.

As further shown in FIG. 7A, and by reference number 720, wireless communication device 705 may determine a set of parameters relating to a state of wireless communication device 705. For example, wireless communication device 705 may determine a mobility state of wireless communication device 705. In some aspects, the mobility state may relate to whether wireless communication device 705 is being moved at at least a threshold speed. For example, wireless communication device 705 may determine that wireless communication device 705 is being moved at at least a threshold speed based at least in part on receiving a set of location identifiers (e.g., GPS coordinates), based at least in part on a determined Doppler effect relating to an uplink or downlink transmission (e.g., the eMBMS signal), based at least in part on receiving speed information from another device (e.g., a GPS module of a vehicle in which wireless communication device 705 is located), and/or the like. In some aspects, wireless communication device 705 may determine that the mobility state satisfies a threshold (e.g., an average Doppler value of 20 hertz (Hz)) associated with determining to decode the eMBMS signal during a measurement gap.

Additionally, or alternatively, wireless communication device 705 may determine an SNR associated with a DL transmission, a UL transmission, and/or the like. For example, wireless communication device 705 may determine an SNR for a unicast DL transmission, an eMBMS transmission, and/or the like. In some aspects, wireless communication device 705 may determine that the SNR satisfies a threshold (e.g., a 5 decibel (dB) SNR) associated with determining to decode the eMBMS signal during a measurement gap. For example, when the SNR satisfies the threshold, wireless communication device 705 may decode a paging radio network temporary identifier (P-RNTI) or a cell radio network temporary identifier (C-RNTI) using page information, and may determine that performing an IRAT or inter-frequency cell measurement is unnecessary.

Additionally, or alternatively, wireless communication device 705 may determine a BLER associated with a DL transmission, a UL transmission, and/or the like. For example, wireless communication device 705 may determine a PDSCH DL BLER, a PUSCH UL BLER, and/or the like. In some aspects, wireless communication device 705 may determine that the BLER satisfies a threshold (e.g., a 10% BLER) associated with determining to decode the eMBMS signal during a measurement gap.

Additionally, or alternatively, wireless communication device 705 may determine a data activity state of wireless communication device 705. For example, wireless communication device 705 may determine that unicast data activity relates to browsing activity (e.g., based at least in part on an application that is active on wireless communication device 705, based at least in part on an amount of data being communicated, and/or the like). Additionally, or alternatively, wireless communication device 705 may determine an FTP throughput, a PDCP PDU size, a PDCCH downlink data count, a PDCCH uplink data count, and/or the like. In some aspects, wireless communication device 705 may determine that the data activity state satisfies a threshold (e.g., a PDC PDU size of 1000 bytes) associated with determining to decode the eMBMS signal during a measurement gap.

The preceding parameters are merely examples of parameters that may be used. In some aspects, the set of parameters may include one or more of the preceding parameters and/or one or more other parameters that may be useful in determining to decode the eMBMS signal during a measurement gap. In other words, the set of parameters may include a single parameter or a combination of parameters. If the set of parameters includes a combination of parameters, the parameters may be weighted to give one parameter a greater measure of importance over another parameter.

As shown in FIG. 7B, and by reference number 720, wireless communication device 705 may determine to decode the eMBMS signal and may decode the eMBMS signal during measurement gaps configured for performing IRAT or inter-frequency cell measurements based at least in part on the set of parameters relating to the state of wireless communication device 705. For example, wireless communication device 705 may receive a set of eMBMS subframes 725 during measurement gaps in schedule 715, and may decode the set of eMBMS subframes 725. Based at least in part on decoding the set of eMBMS subframes 725, wireless communication device 705 may perform audio playback, perform video playback, store a downloaded file, and/or the like. In some aspects, wireless communication device 705 may determine to perform the IRAT or inter-frequency cell measurements during a measurement gap (e.g., another measurement gap). For example, based at least in part on determining that the set of parameters do not satisfy a threshold for a subsequent time period, wireless communication device 705 may perform the IRAT or inter-frequency cell measurement during a measurement gap associated with the subsequent time period.

In this way, wireless communication device 705 dynamically configures utilization of the measurement gaps for eMBMS signal decoding and/or IRAT or inter-frequency cell measurement based at least in part on parameters relating to a state of wireless communication device 705. Based at least in part on dynamically configuring utilization of the measurement gaps, wireless communication device 705 reduces a likelihood of poor eMBMS performance and/or poor network performance relative to statically configuring utilization of the measurement gaps. Similarly, based at least in part on determining not to perform an IRAT or inter-frequency cell measurement, wireless communication device 705 may reduce a utilization of power resources.

Although implementations, described herein, include wireless communication device 705 performing functions, such as determining that a threshold is satisfied, determining a speed based at least in part on a Doppler effect, and/or the like, implementations, described herein, may be performed by a component of wireless communication device 705, such as a modem processor, an application processor, or another similar component, such as additional circuitry, low power circuitry, and/or the like.

As indicated above, FIGS. 7A and 7B are provided as an example. Other examples are possible and may differ from what was described with respect to FIGS. 7A and 7B.

FIG. 8 is a diagram illustrating an example process 800 performed, for example, by a wireless communication device, in accordance with various aspects of the present disclosure. Example process 800 is an example where a wireless communication device (e.g., UE 145, 250, wireless communication device 705, the apparatus 902 of FIG. 9, the apparatus 902' of FIG. 10, and/or the like) utilizes measurement gaps to perform signal decoding.

As shown in FIG. 8, in some aspects, process 800 may include determining, when involved in a multimedia broadcast or multicast service, a set of parameters relating to a state of a wireless communication device (block 810). For example, the wireless communication device may determine, when the wireless communication device is involved in receiving a multimedia broadcast or multicast service, the set of parameters relating to the state of the wireless communication device.

In some aspects, the set of parameters may include at least two of a mobility state of the wireless communication device, an SNR associated with a serving cell of the wireless communication device, a BLER associated with an uplink or downlink channel associated with the wireless communication device, a unicast data activity state of the wireless communication device, and/or the like. In some aspects, the wireless communication device may determine the mobility state of the wireless communication device based at least in part on a Doppler shift of a signal associated with the multimedia broadcast or multicast service. In some aspects, the unicast data activity state of the wireless communication device may relate to a browsing activity, an FTP throughput, a PDCP PDU size, a PDCCH downlink or uplink data count, and/or the like. In some aspects, the wireless communication device may include a screen to provide a user interface, an antenna, and a housing to house one or more processors, a memory, the screen, and the antenna.

As shown in FIG. 8, in some aspects, process 800 may include determining to decode a signal associated with the multimedia broadcast or multicast service during a measurement gap based at least in part on the set of parameters (block 820). For example, the wireless communication device may determine to decode the signal associated with the multimedia broadcast or multicast service during the measurement gap based at least in part on the set of parameters. In some aspects, the measurement gap may be a gap configured for performing an IRAT or inter-frequency cell measurement.

In some aspects, the wireless communication device may decode, during the measurement gap, the signal associated with the multimedia broadcast or multicast service based at least in part on determining to decode the signal.

In some aspects, the wireless communication device may perform, during another measurement gap, the IRAT or the inter-frequency cell measurement based at least in part on another set of parameters related to another state of the wireless communication device. In some aspects, the wireless communication device may perform the IRAT or the inter-frequency cell measurement based at least in part on monitoring one or more neighbor cells of a serving cell of the wireless communication device.

In some aspects, the signal may be an eMBMS signal, and the wireless communication device may decode a PMCH of the eMBMS signal.

Although FIG. 8 shows example blocks of process 800, in some aspects, process 800 may include additional blocks, fewer blocks, different blocks, or differently arranged blocks than those depicted in FIG. 800. Additionally, or alternatively, two or more of the blocks of process 800 may be performed in parallel.

Figure 9:
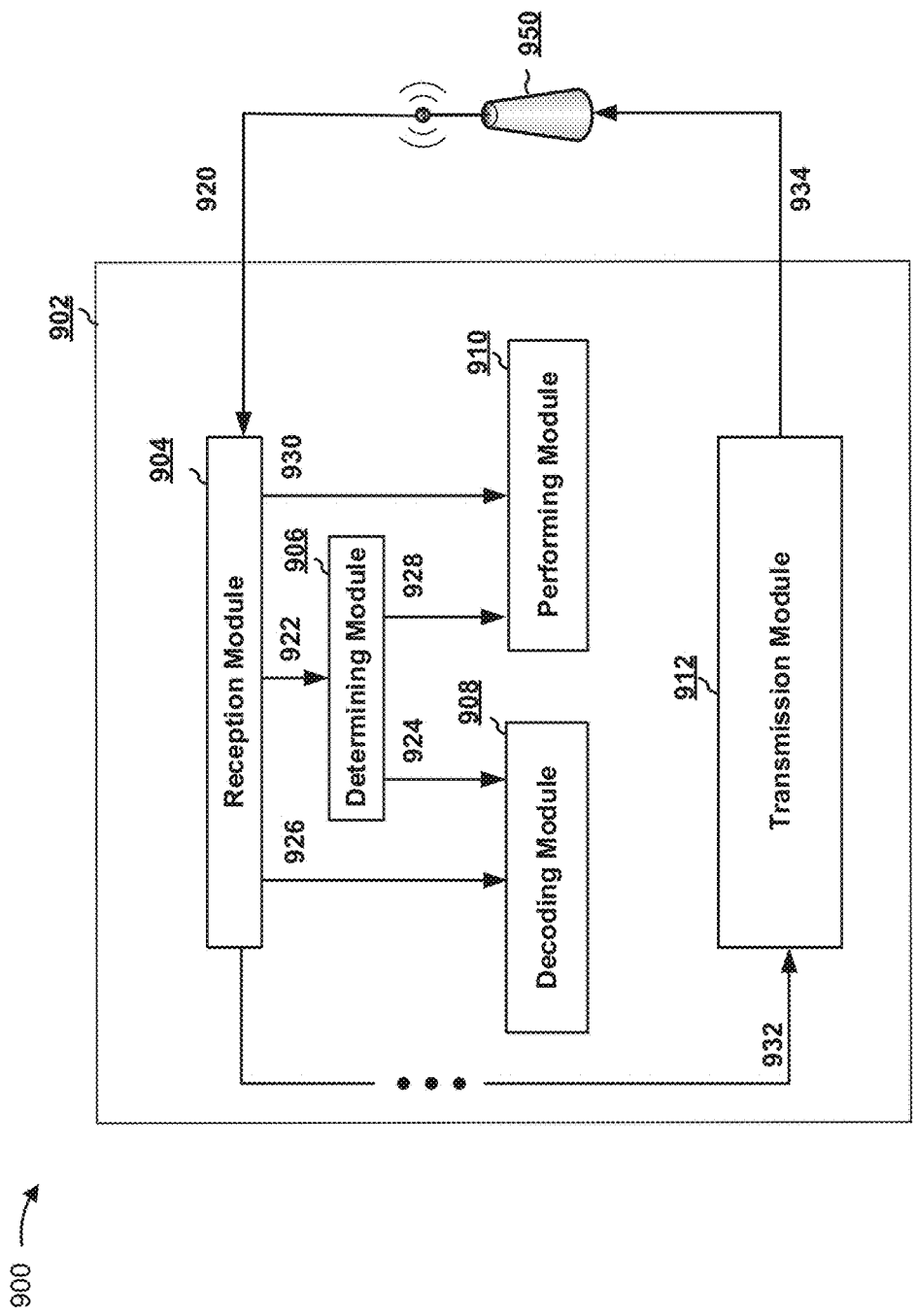
FIG. 9 is a conceptual data flow diagram illustrating the data flow between different modules/means/components in an example apparatus.

FIG. 9 is a conceptual data flow diagram 900 illustrating the data flow between different modules/means/components in an example apparatus 902. The apparatus 902 may be a UE. In some aspects, the apparatus 902 includes a reception module 904, a determining module 906, a decoding module 908, a performing module 910, and/or a transmission module 912. In some aspects, modules 904 through 914 and/or other modules may be software components, hardware components, a combination of software components and firmware components, and/or the like. For example, a UE may implement modules 904 through 914 and/or other modules as software components of a processing system, such as a baseband processor of wireless communication device 705, an application processor of wireless communication device 705, an RX processor 650 of UE 145, 250, a TX processor 680 of UE 145, 250, a controller/processor 660 of UE 145, 250, and/or the like. Additionally, or alternatively, modules 904 through 914 may be implemented in other ways than as described herein.

The reception module 904 may receive, from a base station 950 and as data 920, data associated with a unicast transmission, a multimedia broadcast or multicast transmission (e.g., an eMBMS transmission), and/or the like. In some aspects, the reception module 904 may receive a signaling message that may permit apparatus 902 to determine that apparatus 902 is traveling at a speed that satisfies a threshold. For example, the reception module 904 may receive a positioning signal to determine a change in position and/or another type of signal to calculate a Doppler effect, and may determine a speed based at least in part on determining the change in position and/or the Doppler effect. In some aspects, the reception module 904 may receive data identifying one or more other parameters relating to a state of the apparatus 902, such as an SNR value, a BLER value, and/or the like. In some aspects, the reception module 904 may receive data identifying a schedule of a set of measurement gaps for performing IRAT or inter-frequency cell measurements.

The determining module 906 may receive, from reception module 904 and as data 922, information associated with a unicast transmission, a multimedia broadcast or multicast transmission, and/or the like. For example, the determining module 906 may receive information identifying a set of parameters relating to a state of the apparatus 902, such as information identifying a mobility state of the apparatus 902, an SNR associated with a serving cell of the apparatus 902, a BLER associated with an uplink or downlink channel associated with the apparatus 902, a unicast data activity state of the apparatus 902, and/or the like. Based at least in part on the information identifying the set of parameters, the determining module 906 may determine whether to decode the signal associated with the multimedia broadcast or multicast transmission during the measurement gap or to perform an IRAT or inter-frequency cell measurement during the measurement gap. In some aspects, the determining module 906 may determine a parameter, of the set of parameters, based at least in part on a signal. For example, the determining module 906 may determine a mobility state of the apparatus 902 based at least in part on a Doppler shift associated with the signal of the multimedia broadcast or multicast service.

The decoding module 908 may receive, from the determining module 906 and as data 924, and from the reception module 904 and as data 926, information associated with a signal associated with a multimedia broadcast or multicast service. For example, the decoding module 908 may receive an indication to decode an eMBMS signal during a measurement gap, and may receive the eMBMS signal for decoding. In this case, the decoding module 908 may decode the eMBMS signal for audio playback, video playback, file download and storage, and/or the like. In some aspects, the decoding module 908 may decode a PMCH of the eMBMS signal.

The performing module 910 may receive, from the determining module 906 and as data 928, and from the reception module 904 and as data 930, information associated with a multimedia broadcast or multicast service. For example, the performing module 910 may receive, from the determining module 906, an indication to perform an IRAT or inter-frequency cell measurement during the multimedia broadcast or multicast service, and the performing module 910 may perform the IRAT or inter-frequency cell measurement during a measurement gap. In some aspects, the performing module 910 may perform the IRAT or inter-frequency cell measurement based at least in part on monitoring one or more neighbor cells of a serving cell of the apparatus 902. For example, the performing module 910 may receive information associated with monitoring the one or more neighbor cells from the reception module 904, and may perform the IRAT or inter-frequency cell measurement.

The transmission module 912 may receive, from the reception module 904 and/or one or more intermediate modules, and as data 932, data for transmission. For example, based at least in part on one or more other modules generating data for transmission, such as based at least in part on data 920 being received by reception module 904, transmission module 912 may selectively transmit data 936 to base station 950. In some aspects, the transmission module 912 may provide data 936 to a transceiver and/or an antenna of the apparatus 902 or connected to the apparatus 902 to cause the transceiver and/or the antenna to transmit data 936.

The apparatus 902 may include additional modules that perform each of the blocks of the algorithm in the aforementioned flow chart of FIG. 8. As such, each block in the aforementioned flow chart of FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 9 are provided as an example. In practice, there may be additional modules, fewer modules, different modules, or differently arranged modules than those shown in FIG. 9. Furthermore, two or more modules shown in FIG. 9 may be implemented within a single module, or a single module shown in FIG. 9 may be implemented as multiple, distributed modules. Additionally, or alternatively, a set of modules (e.g., one or more modules) shown in FIG. 9 may perform one or more functions described as being performed by another set of modules shown in FIG. 9.

Figure 10:
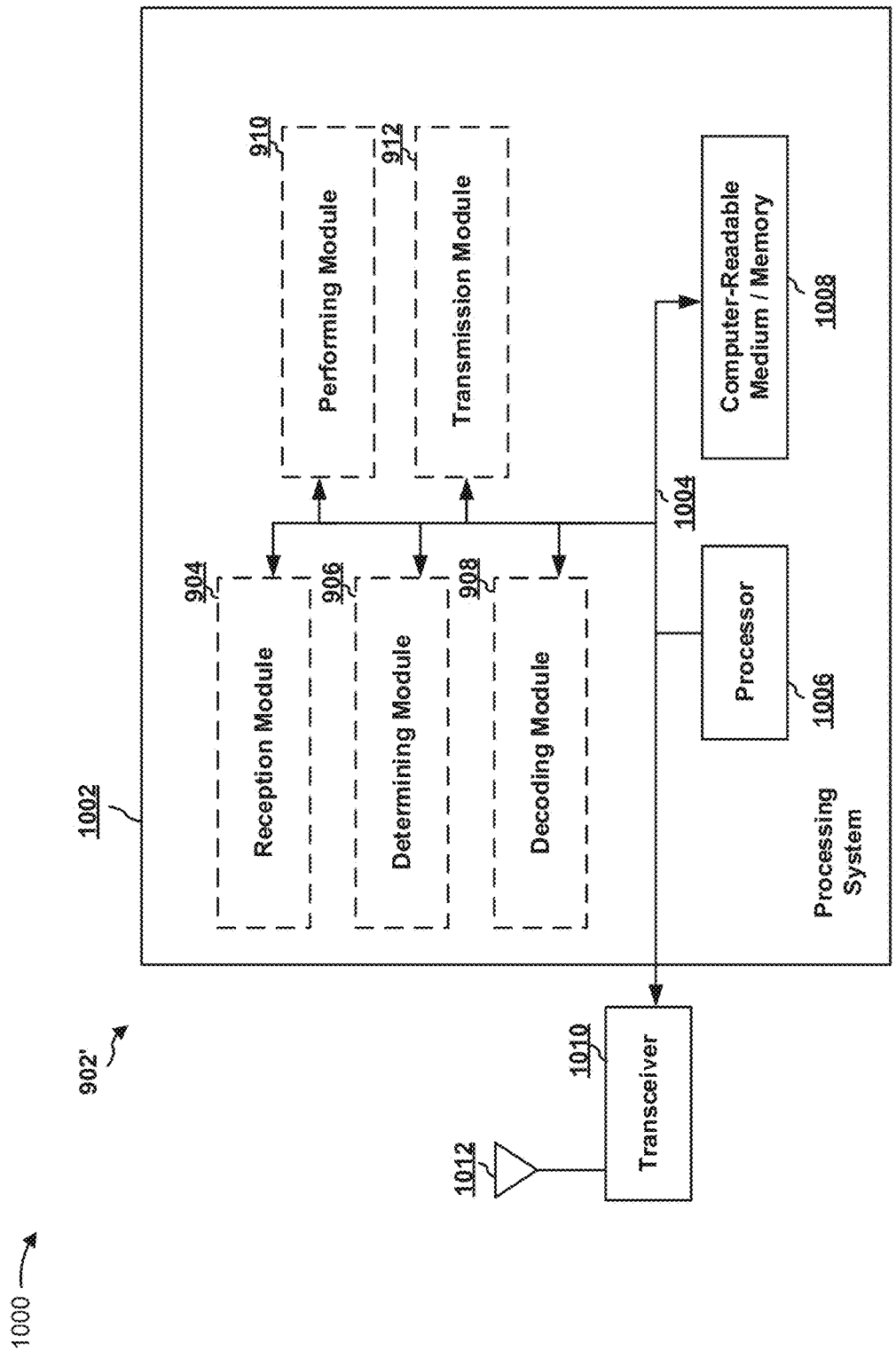
FIG. 10 is a diagram illustrating an example of a hardware implementation for an apparatus employing a processing system.

FIG. 10 is a diagram 1000 illustrating an example of a hardware implementation for an apparatus 902' employing a processing system 1002. The apparatus 902' may be a UE.

The processing system 1002 may be implemented with a bus architecture, represented generally by the bus 1004. The bus 1004 may include any number of interconnecting buses and bridges depending on the specific application of the processing system 1002 and the overall design constraints. The bus 1004 links together various circuits including one or more processors and/or hardware modules, represented by the processor 1006, the modules 904, 906, 908, 910, and 912 and the computer-readable medium/memory 1008. The bus 1004 may also link various other circuits such as timing sources, peripherals, voltage regulators, and power management circuits, which are well known in the art, and therefore, will not be described any further.

Dashed lines of modules 904, 906, 908, 910, 912, and 914 indicate that the modules 904, 906, 908, 910, 912, and 914 are provided for illustration but may be implemented as software or firmware modules of, for example, processor 1006. Additionally, or alternatively, additional modules, fewer modules, or a different combination of modules may be implemented as software or firmware modules of, for example, processor 1006.

The processing system 1002 may be coupled to a transceiver 1010. The transceiver 1010 is coupled to one or more antennas 1012. The transceiver 1010 provides a means for communicating with various other apparatus over a transmission medium. The transceiver 1010 receives a signal from the one or more antennas 1012, extracts information from the received signal, and provides the extracted information to the processing system 1002, specifically the reception module 904. In addition, the transceiver 1010 receives information from the processing system 1002, specifically the transmission module 912, and based at least in part on the received information, generates a signal to be applied to the one or more antennas 1012. The processing system 1002 includes a processor 1006 coupled to a computer-readable medium/memory 1008. The processor 1006 is responsible for general processing, including the execution of software stored on the computer-readable medium/memory 1008. The software, when executed by the processor 1006, causes the processing system 1002 to perform the various functions described supra for any particular apparatus. The computer-readable medium/memory 1008 may also be used for storing data that is manipulated by the processor 1006 when executing software. The processing system further includes at least one of the modules 904, 906, 908, 910, and 912. The modules may be software modules running in the processor 1006, resident/stored in the computer readable medium/memory 1008, one or more hardware modules coupled to the processor 1006, or some combination thereof. The processing system 1002 may be a component of the UE 145, 250 and may include the memory 665 and/or at least one of the TX processor 680, the RX processor 650, and/or the controller/processor 660.

In some aspects, the processor 1006 may be implemented as multiple processors 1006, such as in an application processor 1006, a baseband processor 1006, a graphical processor 1006, and/or the like.

In some aspects, the apparatus 902/902' for wireless communication includes means for determining, when involved in a multimedia broadcast or multicast service, a set of parameters relating to a state of the apparatus 902/902'. In some aspects, the apparatus 902/902' includes means for determining to decode a signal associated with the multimedia broadcast or multicast service during a measurement gap based at least in part on the set of parameters.

In some aspects, the apparatus 902/902' includes means for decoding, during the measurement gap, the signal associated with the multimedia broadcast or multicast service based at least in part on determining to decode the signal. In some aspects, the apparatus 902/902' includes means for performing, during another measurement gap, the IRAT or the inter-frequency cell measurement based at least in part on another set of parameters related to another state of the apparatus 902/902'. In some aspects, the apparatus 902/902' includes means for performing the IRAT or the inter-frequency cell measurement based at least in part on monitoring one or more neighbor cells of a serving cell of the apparatus 902/902'. In some aspects, the apparatus 902/902' includes means for decoding a PMCH of an eMBMS signal. In some aspects, the apparatus 902/902' includes means for determining the mobility state of the UE based at least in part on a Doppler shift of the signal associated with the multimedia broadcast or multicast service.

The aforementioned means may be one or more of the aforementioned modules of the apparatus 902 and/or the processing system 1002 of the apparatus 902' configured to perform the functions recited by the aforementioned means. As described supra, the processing system 1002 may include the TX processor 680, the RX processor 650, and/or the controller/processor 660. As such, in one configuration, the aforementioned means may be the TX processor 680, the RX processor 650, and/or the controller/processor 660 configured to perform the functions recited by the aforementioned means.

FIG. 10 is provided as an example. Other examples are possible and may differ from what was described in connection with FIG. 10.

Figure 11:
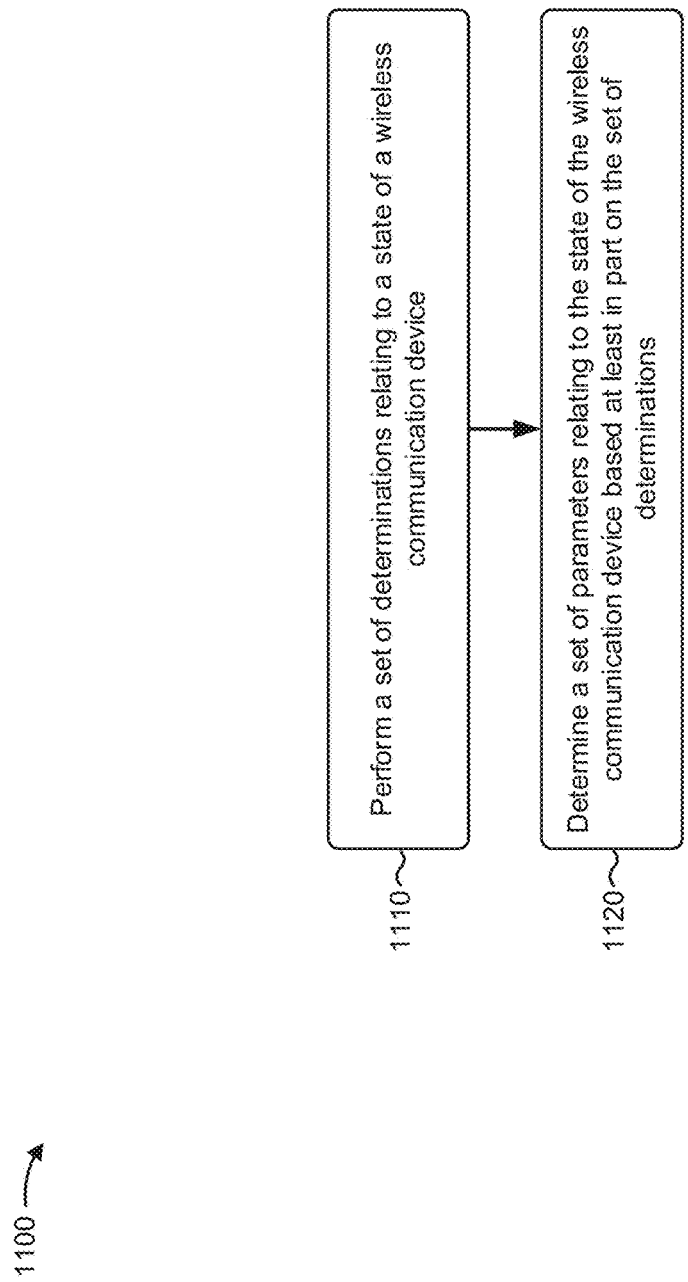
FIG. 11 is a diagram illustrating an example process performed, for example, by a wireless communication device, in accordance with various aspects of the present disclosure.

FIG. 11 is a diagram illustrating an example process 1100 performed, for example, by a wireless communication device, in accordance with various aspects of the present disclosure. Example process 1100 is an example where a wireless communication device (e.g., UE 145, 250, wireless communication device 705, the apparatus 902 of FIG. 9, the apparatus 902' of FIG. 10, and/or the like) determines a set of parameters relating to the state of a wireless communication device.

As shown in FIG. 11, in some aspects, process 110 may include performing a set of determinations relating to a state of a wireless communication device (block 1110). For example, the wireless communication device may perform a determination of whether an eMBMS stream is being received. Additionally, or alternatively, the wireless communication device may determine a signal to noise ratio (SNR) for a signal received by the wireless communication device. Additionally, or alternatively, the wireless communication device may determine a type of unicast data activity that is occurring, such as whether browsing activity is occurring, FTP activity is occurring, a PDCP PDU size for data activity, a UL count for the data activity, a DL count for the data activity, or the like to determine a unicast data activity state of the wireless communication device. Additionally, or alternatively, the wireless communication device may determine a Doppler value for a signal being received by the wireless communication device to determine a mobility state of the wireless communication device.

In some aspects, the wireless communication device may perform a subset of the one or more determinations. For example, based at least in part on a result of determining whether an eMBMS stream is being received (e.g., based at least in part on determining that an eMBMS stream is not being received), the wireless communication device may determine to perform a measurement gap, and may omit an SNR determination, a PDCP PDU related determination, a DL count determination, a UL count determination, a mobility state determination, or the like. In this case, the wireless communication device may perform, an eMBMS stream determination, an SNR determination, a PDCP PDU related determination, a DL count and/or UL count determination, and a Doppler related determination sequentially. Although described herein in terms of a particular order of determinations, other orders of determinations, combinations of determinations, or types of determinations are possible.

In some aspects, a particular component of the wireless communication device may perform the determinations. For example, determining module 906 shown in FIGS. 9 and 10 may perform one or more of the determinations based at least in part on receiving information from reception module 904, performing module 910, or the like. In this case, performing module 910 may perform a measurement (e.g., of a signal), and determining module 906 may determine a parameter relating to the measurement, such as an SNR value, a Doppler value, or the like.

As shown in FIG. 11, in some aspects, process 110 may include determining a set of parameters relating to the state of the wireless communication device based at least in part on the set of determinations (block 1120). For example, the wireless communication device may determine the set of parameters, as described herein with regard to FIG. 8, based at least in part on a result of performing the set of determinations. In some aspects, the wireless communication device may determine a mobility state parameter of the wireless communication device based at least in part on a result of a Doppler value determination. In this case, the wireless communication device may determine a speed at which the wireless communication device is being moved. Additionally, or alternatively, the wireless communication device may determine that the wireless communication device is performing, for example, a browsing activity based at least in part on a PDCP PDU size and/or a DL count or UL count associated with the wireless communication device. Additionally, or alternatively, the wireless communication device may determine a state of a wireless network based at least in part on, for example, an SNR associated with the wireless network.

In some aspects, a particular component of the wireless communication device may perform the determinations. For example, determining module 906 shown in FIGS. 9 and 10 may perform one or more of the determinations based at least in part on other determinations performed by determining module 906. In this case, determining module 906 may determine a parameter relating to a measurement, such as a speed at which the wireless communication device is being moved based at least in part on a Doppler value determined from a signal measurement.

Although FIG. 11 shows example blocks of process 1100, in some aspects, process 1100 may include additional blocks, fewer blocks, different blocks, or differently arranged blocks than those depicted in FIG. 1100. Additionally, or alternatively, two or more of the blocks of process 1100 may be performed in parallel.

Figure 12:
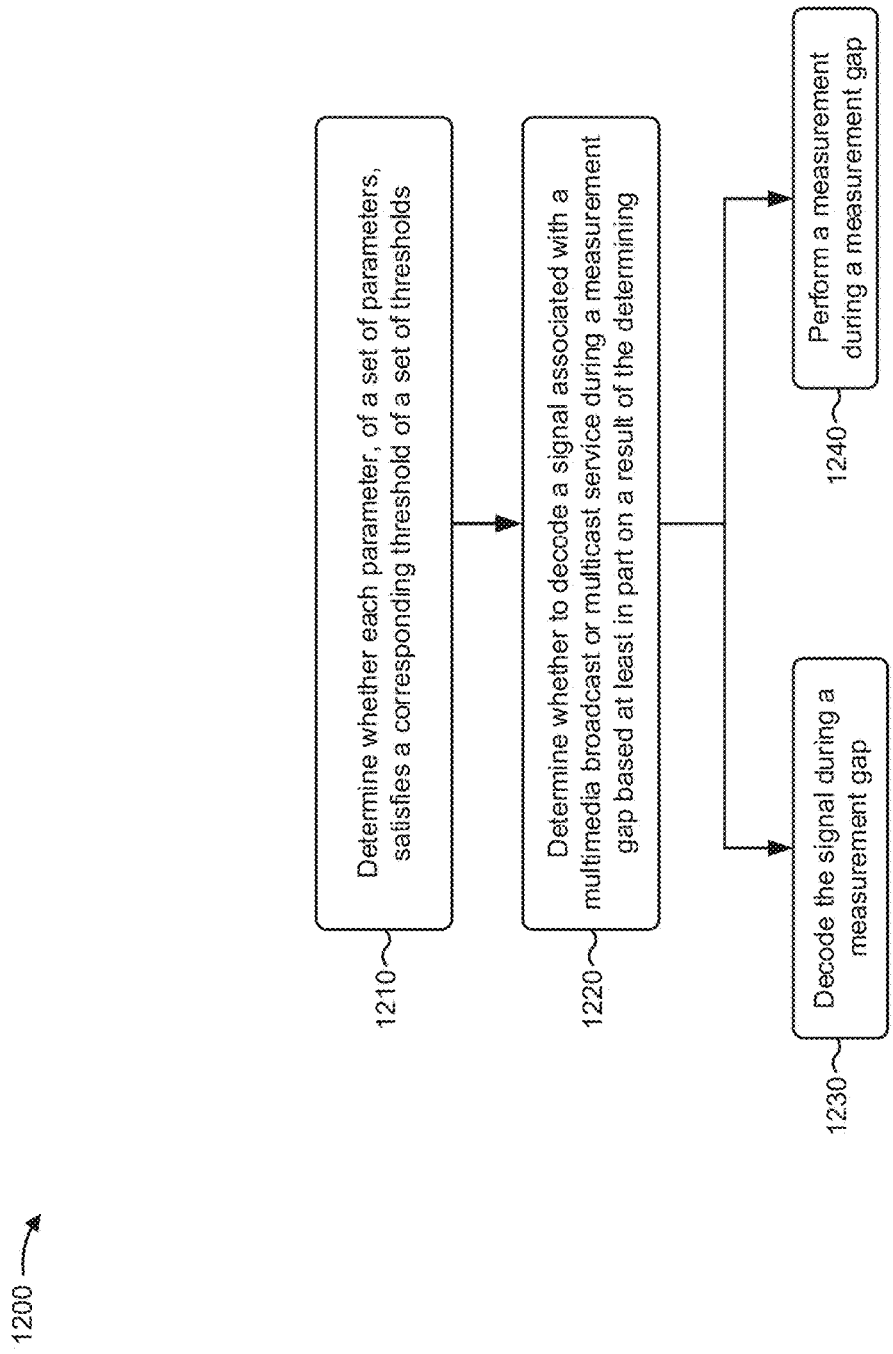
FIG. 12 is a diagram illustrating an example process performed, for example, by a wireless communication device, in accordance with various aspects of the present disclosure.

FIG. 12 is a diagram illustrating an example process 1200 performed, for example, by a wireless communication device, in accordance with various aspects of the present disclosure. Example process 1200 is an example where a wireless communication device (e.g., UE 145, 250, wireless communication device 705, the apparatus 902 of FIG. 9, the apparatus 902' of FIG. 10, and/or the like) determines to decode a signal associated with a multimedia broadcast or multicast service during a measurement gap.

As shown in FIG. 12, in some aspects, process 1200 may include determining whether each parameter, of a set of parameters, satisfies a corresponding threshold of a set of thresholds (block 1210). For example, the wireless communication device may determine that an SNR value is greater than 5, that data activity is less than a threshold limit, and that the UE is being moved at less than a threshold speed (e.g., based at least in part on determining that a Doppler value indicates stationary radio-frequency (RF) conditions), and may determine to decode an eMBMS signal during a measurement gap based at least in part on determining that each parameter satisfies the corresponding threshold. In another example, the wireless communication device may determine that eMBMS streaming is occurring, that an SNR threshold is satisfied, that a PDCP PDU size threshold is satisfied, that a DL count or UL count threshold is satisfied, and that a Doppler value threshold is satisfied, and may determine to decode the eMBMS signal during the measurement gap based at least in part on the determinations. Although described herein in terms of a particular set of parameters and thresholds, another set of parameters and thresholds, another combination of parameters and thresholds, or the like is possible.

In some aspects, the wireless communication device may determine that at least one of the thresholds is not satisfied. For example, the wireless communication device may determine that a mobility state parameter does not satisfy a threshold (e.g., the UE is being moved at greater than a threshold speed). In this case, the wireless communication device may determine to perform a measurement during the measurement gap.

In some aspects, a particular component of the wireless communication device may perform the determinations. For example, determining module 906 shown in FIGS. 9 and 10 may perform one or more of the determinations based at least in part on determining the set of parameters and based at least in part on stored information (e.g., stored in computer-readable medium/memory 1008) identifying the set of thresholds.

As shown in FIG. 12, in some aspects, process 1200 may include determining whether to decode a signal associated with a multimedia broadcast or multicast service during a measurement gap based at least in part on a result of the determining (block 1220). For example, the wireless communication device may determine to decode an eMBMS signal during a measurement gap, and may decode the eMBMS signal, based at least in part on determining that each parameter satisfies a corresponding threshold, as described herein with regard to FIG. 8. In some aspects, the wireless communication device may determine that a subset of the set of parameters satisfies a corresponding subset of thresholds, and may determine to decode the signal based at least in part on a result of the determining. In some aspects, the wireless communication device may determine not to decode the eMBMS signal. For example, based at least in part on determining that one or more parameters do not satisfy corresponding thresholds, the wireless communication device may determine to perform a measurement during a measurement gap.

In some aspects, a particular component of the wireless communication device may perform the determinations. For example, determining module 906 shown in FIGS. 9 and 10 may perform one or more of the determinations based at least in part on determining that the set of parameters satisfies the set of thresholds. In this case, determining module 906 may cause, for example, decoding module 908 to decode the signal.

As shown in FIG. 12, in some aspects, process 1200 may include decoding the signal during a measurement gap (block 1230). For example, the wireless communication device (e.g., decoding module 908 shown in FIGS. 9 and 10) may decode a physical multicast channel (PMCH) of an eMBMS signal (e.g., based at least in part on receiving the PMCH of the eMBMS signal from, for example, reception module 904 shown in FIGS. 9 and 10 and/or transceiver 1010 and antenna 1012 shown in FIG. 10).

As shown in FIG. 12, in some aspects, process 1200 may include performing a measurement during a measurement gap (block 1240). For example, the wireless communication device (e.g., performing module 910 shown in FIGS. 9 and 10) may perform an IRAT or inter-frequency cell measurement in the measurement gap of an eMBMS signal (e.g., based at least in part on monitoring one or more neighbor cells of a serving cell of the wireless communication device using, for example, reception module 904 shown in FIGS. 9 and 10 and/or transceiver 1010 and antenna 1012 shown in FIG. 10). In this case, the IRAT or inter-frequency cell measurement may be a scheduled measurement relating to a measurement gap of the eMBMS signal.

Although FIG. 12 shows example blocks of process 1200, in some aspects, process 1200 may include additional blocks, fewer blocks, different blocks, or differently arranged blocks than those depicted in FIG. 1200. Additionally, or alternatively, two or more of the blocks of process 1200 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method for wireless communication, comprising:
   determining, by a user equipment (UE) involved in a multimedia broadcast or multicast service, a set of parameters relating to a state of the UE;
   determining, by the UE, to decode an evolved multimedia broadcast multicast service (eMBMS) signal during a measurement gap based at least in part on the set of parameters,
      wherein the measurement gap is a gap configured for performing an intra-radio access technology (IRAT) or inter-frequency cell measurement; and
   decoding, by the UE, during the measurement gap, the eMBMS signal based at least in part on determining to decode the eMBMS signal.

2. The method of claim 1, further comprising:
   performing, during another measurement gap, the IRAT or the inter-frequency cell measurement based at least in part on another set of parameters related to another state of the UE.

3. The method of claim 2, further comprising:
   performing the IRAT or the inter-frequency cell measurement based at least in part on monitoring one or more neighbor cells of a serving cell of the UE.

4. The method of claim 1,
   wherein decoding the eMBMS signal comprises:
      decoding a physical multicast channel (PMCH) of the eMBMS signal.

5. The method of claim 1, wherein the set of parameters includes at least two of:
   a mobility state of the UE,
   a signal to noise ratio (SNR) associated with a serving cell of the UE,
   a block error rate (BLER) associated with an uplink or a downlink channel associated with the UE, or
   a unicast data activity state of the UE.

6. The method of claim 5, further comprising:
   determining the mobility state of the UE based at least in part on a Doppler shift of the eMBMS signal.

7. The method of claim 5, wherein the unicast data activity state of the UE relates to at least one of:
   a browsing activity,
   a file transfer protocol (FTP) throughput,
   a packet data convergence protocol (PDCP) protocol data unit (PDU) size, or
   a physical downlink control channel (PDCCH) downlink or uplink data count.

8. The method of claim 1, wherein determining to decode the eMBMS signal is based at least in part on the set of parameters satisfying a set of thresholds.

9. A device for wireless communication, comprising:
   a memory; and
   one or more processors operatively coupled to the memory, the one or more processors configured to:
      determine, when involved in a multimedia broadcast or multicast service, a set of parameters relating to a state of the device;
      determine to decode an evolved multimedia broadcast multicast service (eMBMS) signal during a measurement gap based at least in part on the set of parameters,
         wherein the measurement gap is a gap configured for performing an intra-radio access technology (IRAT) or inter-frequency cell measurement; and
      decode, during the measurement gap, the eMBMS signal based at least in part on determining to decode the eMBMS signal.

10. The device of claim 9, wherein the one or more processors are further configured to:
    perform, during another measurement gap, the IRAT or the inter-frequency cell measurement based at least in part on another set of parameters related to another state of the device.

11. The device of claim 10, wherein the one or more processors are further configured to:
    perform the IRAT or the inter-frequency cell measurement based at least in part on monitoring one or more neighbor cells of a serving cell of the device.

12. The device of claim 9,
    wherein, when decoding the eMBMS signal, the one or more processors are configured to:
       decode a physical multicast channel (PMCH) of the eMBMS signal.

13. The device of claim 9, wherein the set of parameters includes at least two of:
    a mobility state of the device,
    a signal to noise ratio (SNR) associated with a serving cell of the device,
    a block error rate (BLER) associated with an uplink or a downlink channel associated with the device, or
    a unicast data activity state of the device.

14. The device of claim 13, wherein the one or more processors are further configured to:
determine the mobility state of the device based at least in part on a Doppler shift of the signal.

15. The device of claim 13, wherein the unicast data activity state of the device relates to at least one of:
a browsing activity,
a file transfer protocol (FTP) throughput,
a packet data convergence protocol (PDCP) protocol data unit (PDU) size, or
a physical downlink control channel (PDCCH) downlink or uplink data count.

16. The device of claim 9, further comprising:
a screen to provide a user interface;
an antenna; and
a housing to house the one or more processors, the memory, the screen, and the antenna.

17. The device of claim 9, wherein determining to decode the eMBMS signal is based at least in part on the set of parameters satisfying a set of thresholds.

18. A non-transitory computer-readable medium storing one or more instructions for wireless communication, the one or more instructions comprising:
one or more instructions that, when executed by one or more processors of a wireless communication device, cause the one or more processors to:
determine, when involved in a multimedia broadcast or multicast service, a set of parameters relating to a state of the wireless communication device;
determine to decode an evolved multimedia broadcast multicast service (eMBMS) signal during a measurement gap based at least in part on the set of parameters,
wherein the measurement gap is a gap configured for performing an intra-radio access technology (IRAT) or inter-frequency cell measurement; and
decode, during the measurement gap, the eMBMS signal based at least in part on determining to decode the eMBMS signal.

19. The non-transitory computer-readable medium of claim 18, wherein the one or more instructions, when executed by the one or more processors, further cause the one or more processors to:
perform, during another measurement gap, the IRAT or the inter-frequency cell measurement based at least in part on another set of parameters related to another state of the wireless communication device.

20. The non-transitory computer-readable medium of claim 19, wherein the one or more instructions, when executed by the one or more processors, further cause the one or more processors to:
perform the IRAT or the inter-frequency cell measurement based at least in part on monitoring one or more neighbor cells of a serving cell of the wireless communication device.

21. The non-transitory computer-readable medium of claim 18,
wherein the one or more instructions to decode the eMBMS signal cause the one or more processors to:
decode a physical multicast channel (PMCH) of the eMBMS signal.

22. The non-transitory computer-readable medium of claim 18, wherein the set of parameters includes at least two of:
a mobility state of the wireless communication device,
a signal to noise ratio (SNR) associated with a serving cell of the wireless communication device,
a block error rate (BLER) associated with an uplink or a downlink channel associated with the wireless communication device, or
a unicast data activity state of the wireless communication device.

23. The non-transitory computer-readable medium of claim 22, wherein the one or more instructions, when executed by the one or more processors, further cause the one or more processors to:
determine the mobility state of the wireless communication device based at least in part on a Doppler shift of the signal.

24. The non-transitory computer-readable medium of claim 18, wherein determining to decode the eMBMS signal is based at least in part on the set of parameters satisfying a set of thresholds.

25. An apparatus for wireless communication, comprising:
means for determining, when involved in a multimedia broadcast or multicast service, a set of parameters relating to a state of the apparatus;
means for determining to decode an evolved multimedia broadcast multicast service (eMBMS) signal during a measurement gap based at least in part on the set of parameters,
wherein the measurement gap is a gap configured for performing an intra-radio access technology (IRAT) or inter-frequency cell measurement; and
means for decoding, during the measurement gap, the eMBMS signal based at least in part on determining to decode the eMBMS signal.

26. The apparatus of claim 25, further comprising:
means for performing, during another measurement gap, the IRAT or the inter-frequency cell measurement based at least in part on another set of parameters related to another state of the apparatus.

27. The apparatus of claim 26, further comprising:
means for performing the IRAT or the inter-frequency cell measurement based at least in part on monitoring one or more neighbor cells of a serving cell of the apparatus.

28. The apparatus of claim 25,
wherein the means for decoding the eMBMS signal comprises:
means for decoding a physical multicast channel (PMCH) of the eMBMS signal.

29. The apparatus of claim 25, wherein the set of parameters includes at least two of:
a mobility state of the apparatus,
a signal to noise ratio (SNR) associated with a serving cell of the apparatus,
a block error rate (BLER) associated with an uplink or a downlink channel associated with the apparatus, or
a unicast data activity state of the apparatus.

30. The apparatus of claim 25, wherein determining to decode the eMBMS signal is based at least in part on the set of parameters satisfying a set of thresholds.

* * * * *